United States Patent
Wu et al.

(10) Patent No.: US 12,047,901 B2
(45) Date of Patent: Jul. 23, 2024

(54) SIDELINK RANGING WITH ROAD-SIDE UNIT ASSISTANCE

(71) Applicant: QUALCOMM Incorporated, San Diego, CA (US)

(72) Inventors: Shuanshuan Wu, San Diego, CA (US); Kapil Gulati, Belle Mead, NJ (US); Junyi Li, Fairless Hills, PA (US); Sourjya Dutta, San Diego, CA (US); Anantharaman Balasubramanian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 328 days.

(21) Appl. No.: 17/652,584

(22) Filed: Feb. 25, 2022

(65) Prior Publication Data

US 2023/0276402 A1 Aug. 31, 2023

(51) Int. Cl.
*H04W 64/00* (2009.01)
*H04L 43/0864* (2022.01)

(52) U.S. Cl.
CPC ....... *H04W 64/003* (2013.01); *H04L 43/0864* (2013.01)

(58) Field of Classification Search
CPC .............. H04W 64/003; H04L 43/0864; G01S 13/765; G01S 13/87; G01S 13/825; G01S 13/931; G01S 2013/9316; G01S 7/006
See application file for complete search history.

(56) References Cited

U.S. PATENT DOCUMENTS

2016/0277888 A1 9/2016 Niesen et al.
2020/0113015 A1* 4/2020 Basu Mallick ....... H04W 48/18
2022/0053422 A1* 2/2022 Choi ..................... H04W 48/10
2022/0132462 A1* 4/2022 Balasubramanian ........................ G01S 5/0072
2023/0076030 A1* 3/2023 Baek ..................... H04W 24/10
2023/0213607 A1* 7/2023 Dong ....................... G01S 5/14
342/463

FOREIGN PATENT DOCUMENTS

| EP | 4163661 A1 | 4/2023 |
| WO | 2021243723 A1 | 12/2021 |
| WO | 2022016335 A1 | 1/2022 |

OTHER PUBLICATIONS

WO/2019/158223 (Year: 2019).*
International Search Report and Written Opinion—PCT/US2023/060041—ISA/EPO—Jul. 14, 2023.

* cited by examiner

*Primary Examiner* — Siu M Lee
(74) *Attorney, Agent, or Firm* — Thien T. Nguyen

(57) ABSTRACT

Disclosed are techniques for wireless positioning. In an aspect, a road-side unit (RSU) may join a first sidelink (SL) ranging session between a first user equipment (UE) and a second UE. The RSU may perform SL ranging with the first UE to determine first ranging information comprising at least a RTT to the first UE. The RSU may perform SL ranging with the second UE to determine second ranging information comprising at least a RTT to the second UE. The RSU may send the first ranging information and the second ranging information to at least one of the first UE or the second UE, or calculate a range between the first UE and the second UE based on the first ranging information and the second ranging information, and send the range to at least one of the first UE and the second UE.

30 Claims, 16 Drawing Sheets

SIDELINK RANGING WITH ROAD-SIDE UNIT ASSISTANCE

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), enables higher data transfer speeds, greater numbers of connections, and better coverage, among other improvements. The 5G standard, according to the Next Generation Mobile Networks Alliance, is designed to provide higher data rates as compared to previous standards, more accurate positioning (e.g., based on reference signals for positioning (RS-P), such as downlink, uplink, or sidelink positioning reference signals (PRS)) and other technical enhancements.

Leveraging the increased data rates and decreased latency of 5G, among other things, vehicle-to-everything (V2X) communication technologies are being implemented to support autonomous driving applications, such as wireless communications between vehicles, between vehicles and the roadside infrastructure, between vehicles and pedestrians, etc.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless positioning performed by a road-side unit (RSU) includes joining a first sidelink (SL) ranging session between a first user equipment (UE) and a second UE; performing SL ranging with the first UE to determine first ranging information comprising at least a round-trip time (RTT) to the first UE; performing SL ranging with the second UE to determine second ranging information comprising at least a RTT to the second UE; and at least one of: sending the first ranging information and the second ranging information to at least one of the first UE or the second UE; or calculating a range between the first UE and the second UE based on the first ranging information and the second ranging information, and sending the range to at least one of the first UE and the second UE.

In an aspect, a method of wireless positioning performed by a first UE that is participating in an SL ranging session with a second UE includes detecting a RSU with SL ranging capability; determining to request SL ranging assistance from the RSU; adding the RSU to the SL ranging session; performing SL ranging with the RSU; and at least one of: receiving, from the RSU, a range between the first UE and the second UE; or receiving, from the RSU, first ranging information comprising at least a RTT between the RSU and the first UE and second ranging information comprising at least a RTT between the RSU and the second UE, and calculating a range between the first UE and the second UE based on the first ranging information and the second ranging information.

In an aspect, a RSU includes a memory; at least one transceiver; and at least one processor communicatively coupled to the memory and the at least one transceiver, the at least one processor configured to: join a first SL ranging session between a first UE and a second UE; perform SL ranging with the first UE to determine first ranging information comprising at least a RTT to the first UE; perform SL ranging with the second UE to determine second ranging information comprising at least a RTT to the second UE; and at least one of: send, via the at least one transceiver, the first ranging information and the second ranging information to at least one of the first UE or the second UE; or calculate a range between the first UE and the second UE based on the first ranging information and the second ranging information, and send, via the at least one transceiver, the range to at least one of the first UE and the second UE.

In an aspect, a UE includes a memory; at least one transceiver; and at least one processor communicatively coupled to the memory and the at least one transceiver, the at least one processor configured to: detect a RSU with SL ranging capability; determine to request SL ranging assistance from the RSU; add the RSU to a SL ranging session between the UE and a second UE; perform SL ranging with the RSU; and at least one of: receive, from the RSU via the at least one transceiver, a range between the UE and the second UE; or receive, from the RSU via the at least one transceiver, first ranging information comprising at least a RTT between the RSU and the UE and second ranging information comprising at least a RTT between the RSU and the second UE, and calculate a range between the UE and the second UE based on the first ranging information and the second ranging information.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
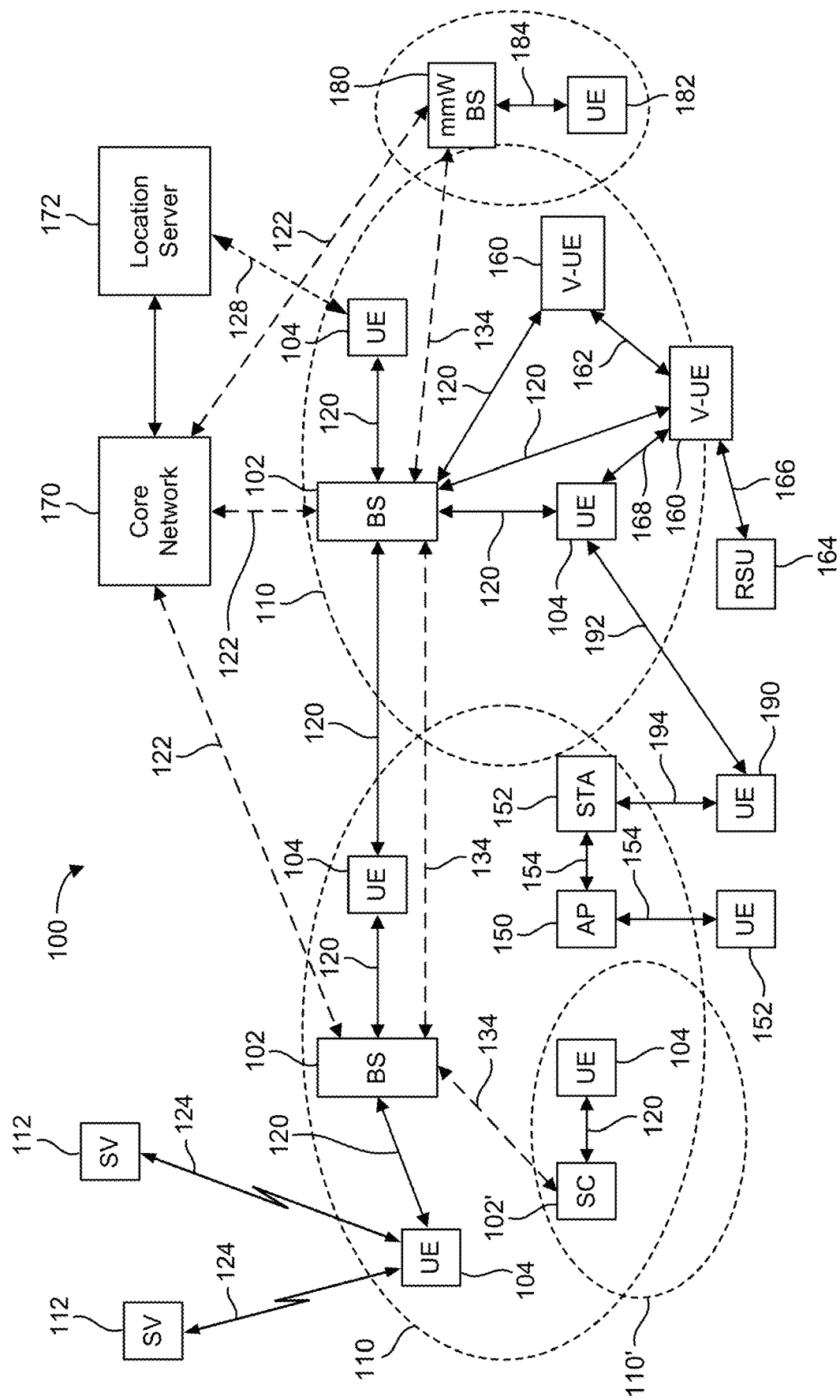
FIG. 1 illustrates an example wireless communications system, according to aspects of the disclosure.

Disclosed are techniques for wireless positioning. In an aspect, a road-side unit (RSU) may join a first sidelink (SL) ranging session between a first user equipment (UE) and a second UE. The RSU may perform SL ranging with the first UE to determine first ranging information comprising at least a RTT to the first UE. The RSU may perform SL ranging with the second UE to determine second ranging information comprising at least a RTT to the second UE. The RSU may send the first ranging information and the second ranging information to at least one of the first UE or the second UE, or calculate a range between the first UE and the second UE based on the first ranging information and the second ranging information, and send the range to at least one of the first UE and the second UE.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE), "vehicle UE" (V-UE), "pedestrian UE" (P-UE), and "base station" are not intended to be specific or otherwise limited to any particular radio access technology (RAT), unless otherwise noted. In general, a UE may be any wireless communication device (e.g., vehicle on-board computer, vehicle navigation device, mobile phone, router, tablet computer, laptop computer, asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as a "mobile device," an "access terminal" or "AT," a "client device," a "wireless device," a "subscriber device," a "subscriber terminal," a "subscriber station," a "user terminal" or UT, a "mobile terminal," a "mobile station," or variations thereof.

A V-UE is a type of UE and may be any in-vehicle wireless communication device, such as a navigation system, a warning system, a heads-up display (HUD), an on-board computer, an in-vehicle infotainment system, an automated driving system (ADS), an advanced driver assistance system (ADAS), etc. Alternatively, a V-UE may be a portable wireless communication device (e.g., a cell phone, tablet computer, etc.) that is carried by the driver of the vehicle or a passenger in the vehicle. The term "V-UE" may refer to the in-vehicle wireless communication device or the vehicle itself, depending on the context. A P-UE is a type of UE and may be a portable wireless communication device that is carried by a pedestrian (i.e., a user that is not driving or riding in a vehicle). Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks, (e.g., based on Institute of Electrical and Electronics Engineers (IEEE) 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs including supporting data, voice and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference RF signals to UEs to be measured by the UEs and/or may receive and measure signals transmitted by the UEs. Such base stations may be referred to as positioning beacons (e.g., when transmitting RF signals to UEs) and/or as location measurement units (e.g., when receiving and measuring RF signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labelled "BS") and various UEs 104. The base stations 102 may include macro cell base stations (high power cellular base stations) and/or small cell base stations (low power cellular base stations). In an aspect, the macro cell base stations 102 may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. A location server 172 may be integrated with a base station 102. A UE 104 may communicate with a location server 172 directly or indirectly. For example, a UE 104 may communicate with a location server 172 via the base station 102 that is currently serving that UE 104. A UE 104 may also communicate with a location server 172 through another path, such as via an application server (not shown), via another network, such as via a wireless local area network (WLAN) access point (AP) (e.g., AP 150 described below), and so on. For signaling purposes, communication between a UE 104 and a location server 172 may be represented as an indirect connection (e.g., through the core network 170, etc.) or a direct connection (e.g., as shown via direct connection 128), with the intervening nodes (if any) omitted from a signaling diagram for clarity.

In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labelled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen-before-talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a mmW base station 180 that may operate in millimeter wave (mmW) frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

Leveraging the increased data rates and decreased latency of NR, among other things, vehicle-to-everything (V2X) communication technologies are being implemented to support intelligent transportation systems (ITS) applications, such as wireless communications between vehicles (vehicle-to-vehicle (V2V)), between vehicles and the roadside infrastructure (vehicle-to-infrastructure (V2I)), and between vehicles and pedestrians (vehicle-to-pedestrian (V2P)). The goal is for vehicles to be able to sense the environment around them and communicate that information to other vehicles, infrastructure, and personal mobile devices. Such vehicle communication will enable safety, mobility, and environmental advancements that current technologies are unable to provide. Once fully implemented, the technology is expected to reduce unimpaired vehicle crashes by 80%.

Still referring to FIG. 1, the wireless communications system 100 may include multiple V-UEs 160 that may communicate with base stations 102 over communication links 120 using the Uu interface (i.e., the air interface between a UE and a base station). V-UEs 160 may also communicate directly with each other over a wireless sidelink 162, with a roadside unit (RSU) 164 (a roadside access point) over a wireless sidelink 166, or with sidelink-capable UEs 104 over a wireless sidelink 168 using the PC5 interface (i.e., the air interface between sidelink-capable UEs). A wireless sidelink (or just "sidelink") is an adaptation of the core cellular (e.g., LTE, NR) standard that allows direct communication between two or more UEs without the communication needing to go through a base station. Sidelink communication may be unicast or multicast, and may be used for device-to-device (D2D) media-sharing, V2V communication, V2X communication (e.g., cellular V2X (cV2X) communication, enhanced V2X (eV2X) communication, etc.), emergency rescue applications, etc. One or more of a group of V-UEs 160 utilizing sidelink communications may be within the geographic coverage area 110 of a base station 102. Other V-UEs 160 in such a group may be outside the geographic coverage area 110 of a base station 102 or be otherwise unable to receive transmissions from a base station 102. In some cases, groups of V-UEs 160 communicating via sidelink communications may utilize a one-to-many (1:M) system in which each V-UE 160 transmits to every other V-UE 160 in the group. In some cases, a base station 102 facilitates the scheduling of resources for sidelink communications. In other cases, sidelink communications are carried out between V-UEs 160 without the involvement of a base station 102.

In an aspect, the sidelinks 162, 166, 168 may operate over a wireless communication medium of interest, which may be shared with other wireless communications between other vehicles and/or infrastructure access points, as well as other RATs. A "medium" may be composed of one or more time, frequency, and/or space communication resources (e.g., encompassing one or more channels across one or more carriers) associated with wireless communication between one or more transmitter/receiver pairs.

In an aspect, the sidelinks 162, 166, 168 may be cV2X links. A first generation of cV2X has been standardized in LTE, and the next generation is expected to be defined in NR. cV2X is a cellular technology that also enables device-to-device communications. In the U.S. and Europe, cV2X is expected to operate in the licensed ITS band in sub-6 GHz. Other bands may be allocated in other countries. Thus, as a particular example, the medium of interest utilized by sidelinks 162, 166, 168 may correspond to at least a portion of the licensed ITS frequency band of sub-6 GHz. However, the present disclosure is not limited to this frequency band or cellular technology.

In an aspect, the sidelinks 162, 166, 168 may be dedicated short-range communications (DSRC) links. DSRC is a one-way or two-way short-range to medium-range wireless communication protocol that uses the wireless access for vehicular environments (WAVE) protocol, also known as IEEE 802.11p, for V2V, V2I, and V2P communications. IEEE 802.11p is an approved amendment to the IEEE 802.11 standard and operates in the licensed ITS band of 5.9 GHz (5.85-5.925 GHz) in the U.S. In Europe, IEEE 802.11p operates in the ITS G5A band (5.875-5.905 MHz). Other bands may be allocated in other countries. The V2V communications briefly described above occur on the Safety Channel, which in the U.S. is typically a 10 MHz channel that is dedicated to the purpose of safety. The remainder of the DSRC band (the total bandwidth is 75 MHz) is intended for other services of interest to drivers, such as road rules, tolling, parking automation, etc. Thus, as a particular example, the mediums of interest utilized by sidelinks 162, 166, 168 may correspond to at least a portion of the licensed ITS frequency band of 5.9 GHz.

Alternatively, the medium of interest may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the Unlicensed National Information Infrastructure (U-NII) band used by wireless local area network (WLAN) technologies, most notably IEEE 802.11x WLAN technologies generally referred to as "Wi-Fi." Example systems of this type include different variants of CDMA systems, TDMA systems, FDMA systems, orthogonal FDMA (OFDMA) systems, single-carrier FDMA (SC-FDMA) systems, and so on.

Communications between the V-UEs 160 are referred to as V2V communications, communications between the V-UEs 160 and the one or more RSUs 164 are referred to as V2I communications, and communications between the V-UEs 160 and one or more UEs 104 (where the UEs 104 are P-UEs) are referred to as V2P communications. The V2V communications between V-UEs 160 may include, for example, information about the position, speed, acceleration, heading, and other vehicle data of the V-UEs 160. The V2I information received at a V-UE 160 from the one or more RSUs 164 may include, for example, road rules, parking automation information, etc. The V2P communications between a V-UE 160 and a UE 104 may include information about, for example, the position, speed, acceleration, and heading of the V-UE 160 and the position, speed (e.g., where the UE 104 is carried by a user on a bicycle), and heading of the UE 104.

Note that although FIG. 1 only illustrates two of the UEs as V-UEs (V-UEs 160), any of the illustrated UEs (e.g., UEs 104, 152, 182, 190) may be V-UEs. In addition, while only the V-UEs 160 and a single UE 104 have been illustrated as being connected over a sidelink, any of the UEs illustrated in FIG. 1, whether V-UEs, P-UEs, etc., may be capable of sidelink communication. Further, although only UE 182 was described as being capable of beam forming, any of the illustrated UEs, including V-UEs 160, may be capable of beam forming. Where V-UEs 160 are capable of beam forming, they may beam form towards each other (i.e., towards other V-UEs 160), towards RSUs 164, towards other UEs (e.g., UEs 104, 152, 182, 190), etc. Thus, in some cases, V-UEs 160 may utilize beamforming over sidelinks 162, 166, and 168.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on. As another example, the D2D P2P links 192 and 194 may be sidelinks, as described above with reference to sidelinks 162, 166, and 168.

Figure 2A:
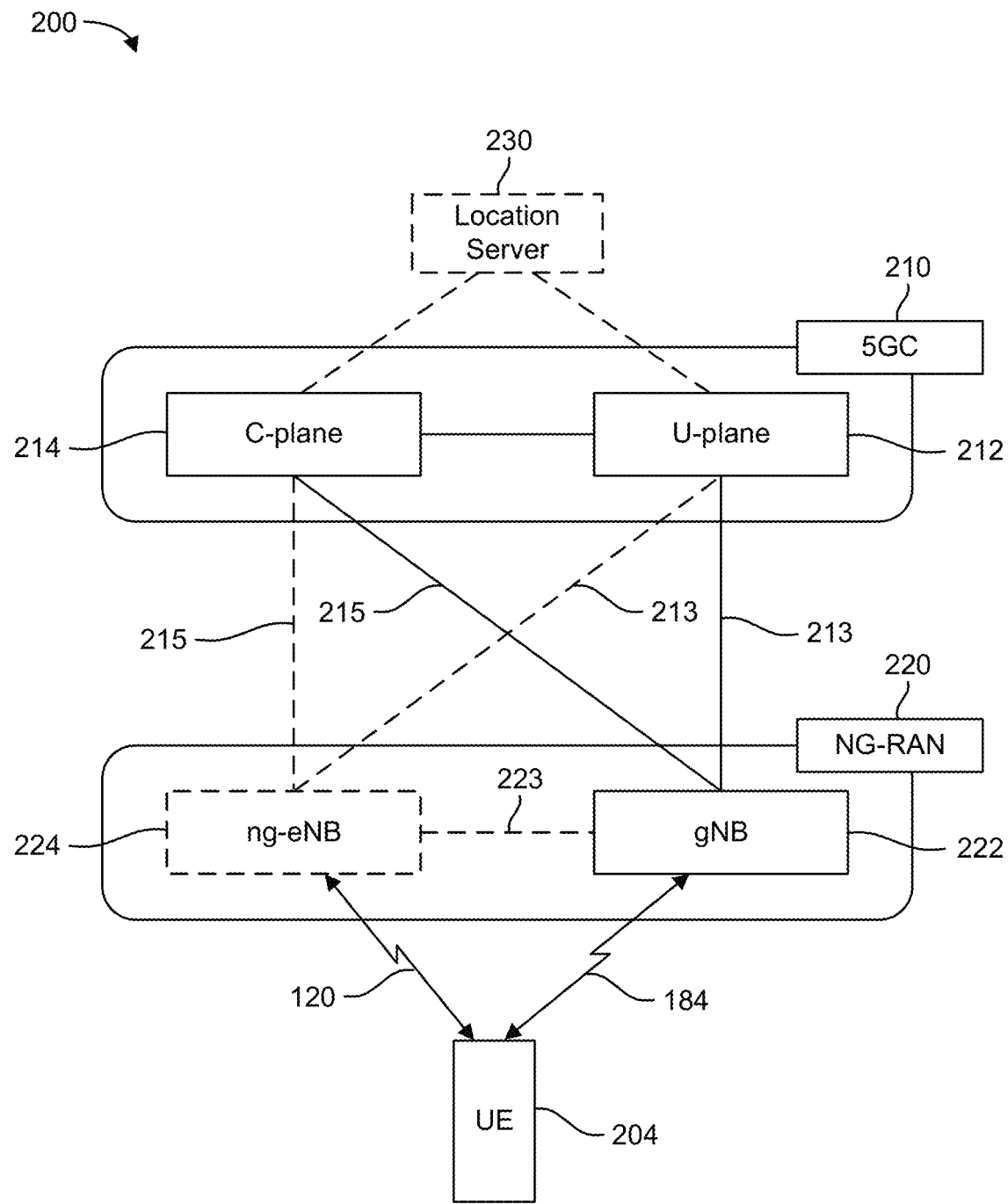
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
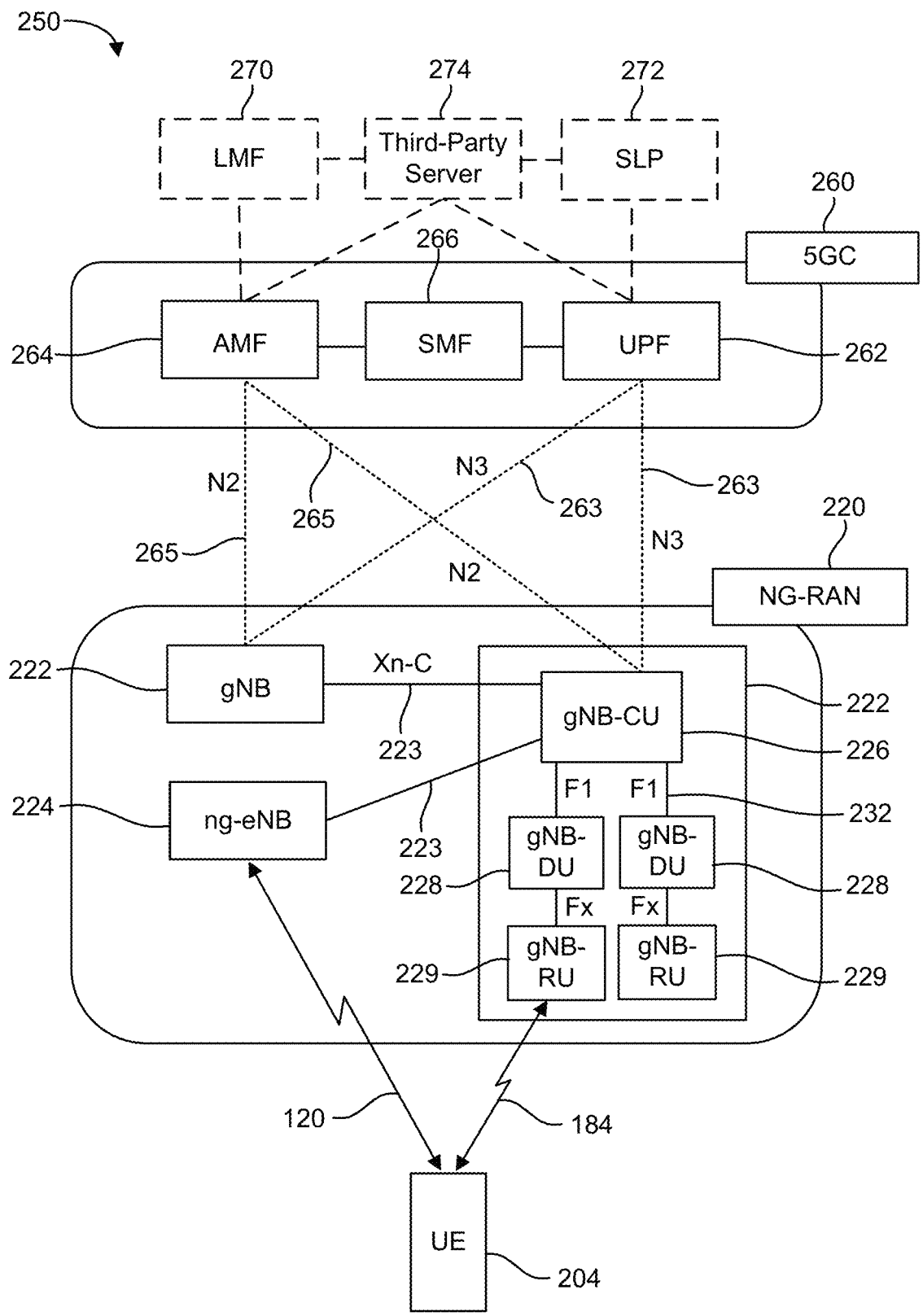

FIG. 2B illustrates another example wireless network structure 250. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (e.g., third-party server 274) over a user plane (e.g., using protocols intended to carry voice and/or data like the transmission control protocol (TCP) and/or IP).

Yet another optional aspect may include a third-party server 274, which may be in communication with the LMF 270, the SLP 272, the 5GC 260 (e.g., via the AMF 264 and/or the UPF 262), the NG-RAN 220, and/or the UE 204 to obtain location information (e.g., a location estimate) for the UE 204. As such, in some cases, the third-party server 274 may be referred to as a location services (LCS) client or an external client. The third-party server 274 can be implemented as a plurality of separate servers (e.g., physically separate servers, different software modules on a single server, different software modules spread across multiple physical servers, etc.), or alternately may each correspond to a single server.

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 may be divided between a gNB central unit (gNB-CU) 226, one or more gNB distributed units (gNB-DUs) 228, and one or more gNB radio units (gNB-RUs) 229. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 generally host the radio resource control (RRC), service data adaptation protocol (SDAP), and packet data convergence protocol (PDCP) protocols of the gNB 222. A gNB-DU 228 is a logical node that generally hosts the radio link control (RLC) and medium access control (MAC) layer of the gNB 222. Its operation is controlled by the gNB-CU 226. One gNB-DU 228 can support one or more cells, and one cell is supported by only one gNB-DU 228. The interface 232 between the gNB-CU 226 and the one or more gNB-DUs 228 is referred to as the "F1" interface. The physical (PHY) layer functionality of a gNB 222 is generally hosted by one or more standalone gNB-RUs 229 that perform functions such as power amplification and signal transmission/reception. The interface between a gNB-DU 228 and a gNB-RU 229 is referred to as the "Fx" interface. Thus, a UE 204 communicates with the gNB-CU 226 via the RRC, SDAP, and PDCP layers, with a gNB-DU 228 via the RLC and MAC layers, and with a gNB-RU 229 via the PHY layer.

Figure 3A:
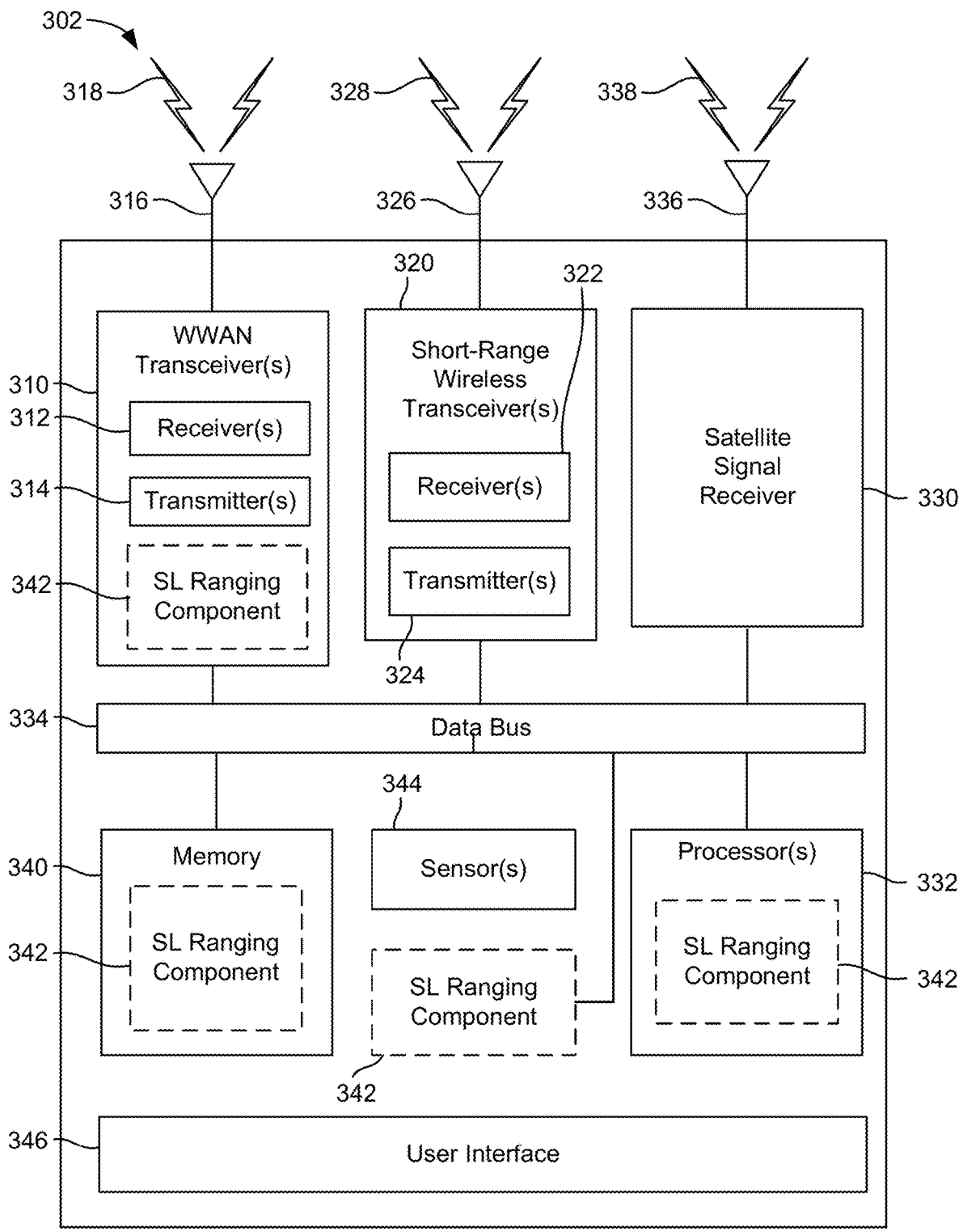
FIGS. 3A, 3B, and 3C are simplified block diagrams of several sample aspects of components that may be employed in a user equipment (UE), a base station, and a network entity, respectively, and configured to support communications as taught herein.
Figure 3B:
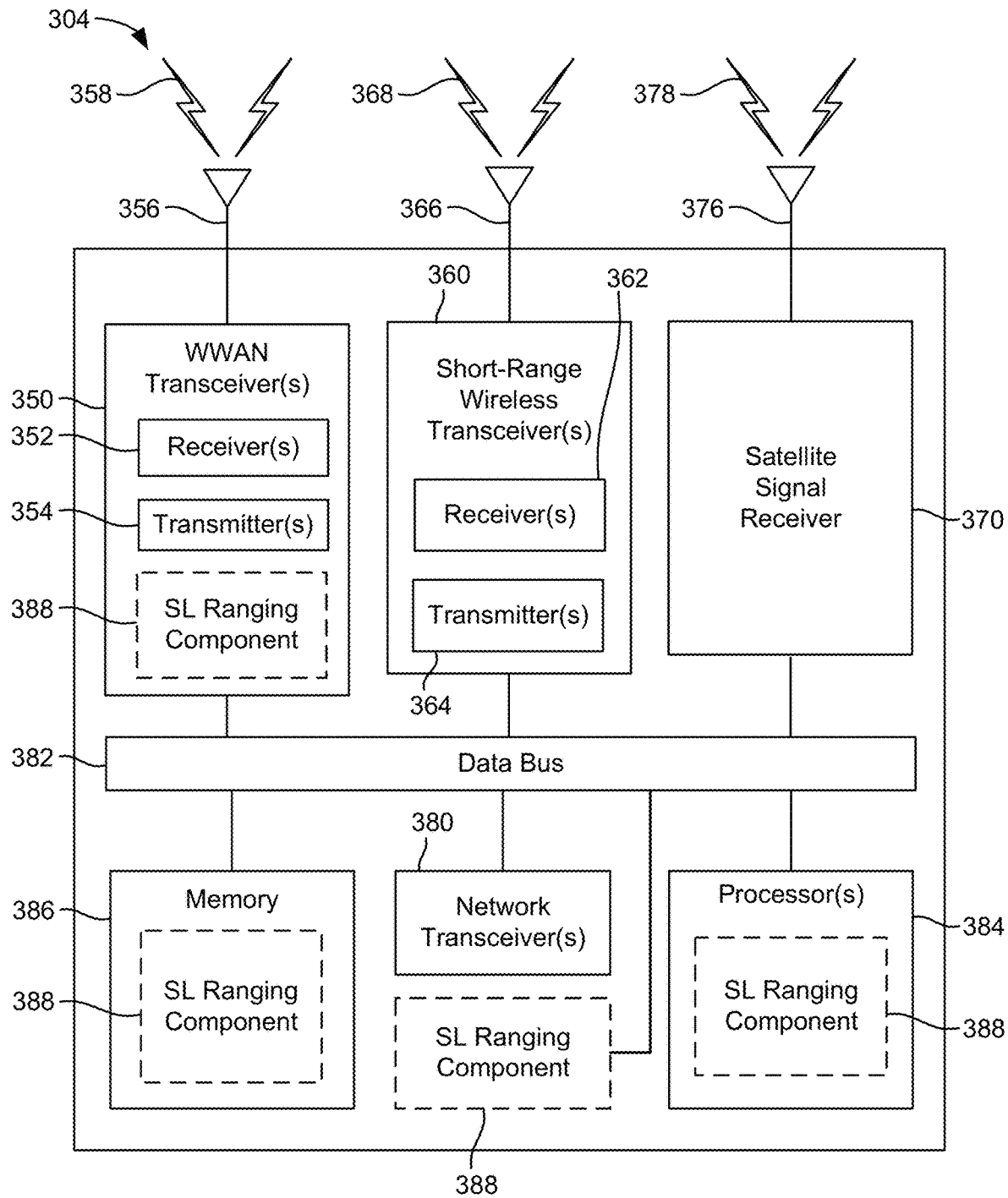
Figure 3C:
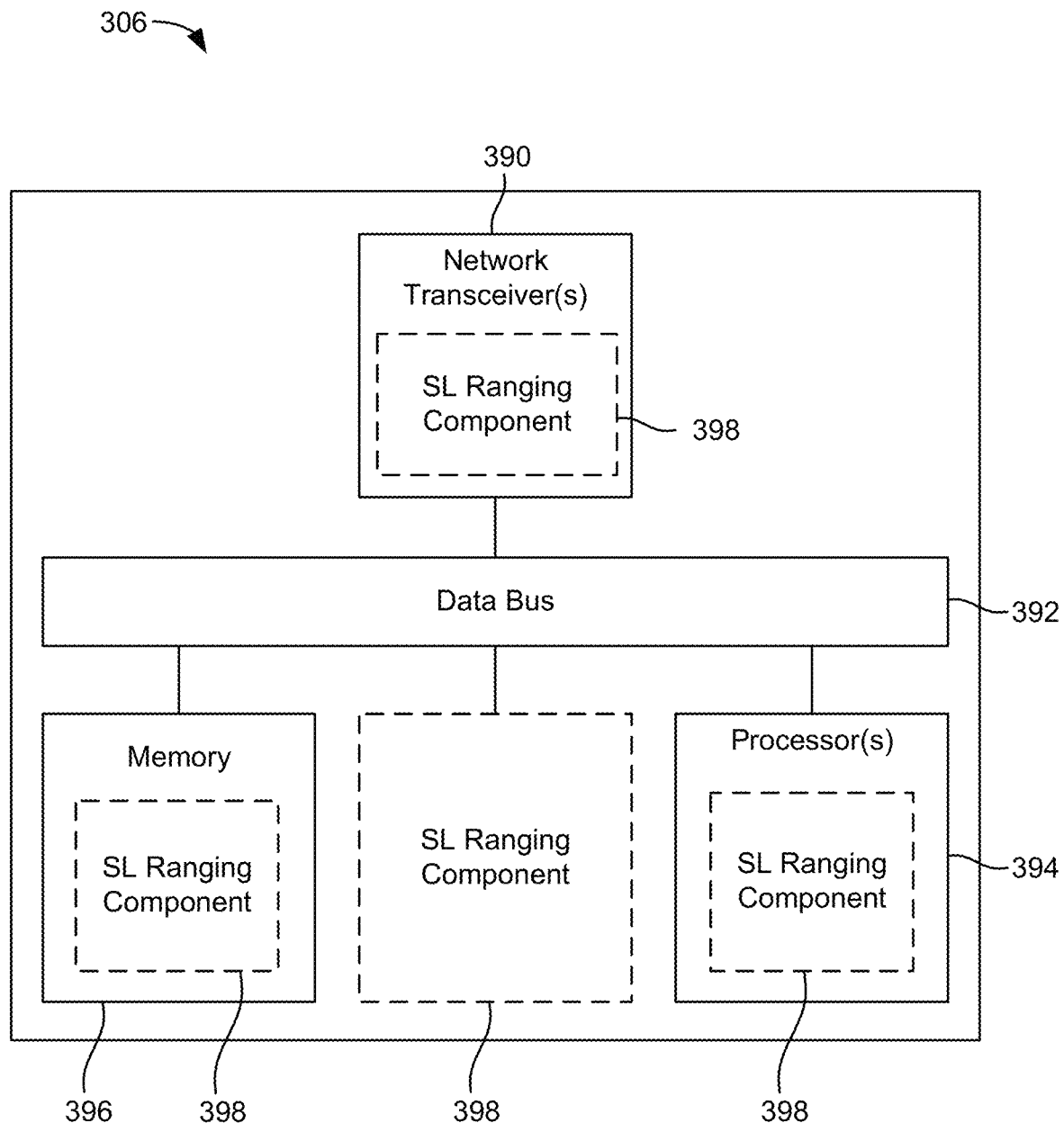

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the operations described herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), etc.) over a wireless communication medium of interest. The short-range wireless transceivers 320 and 360 may be variously configured for transmitting and encoding signals 328 and 368 (e.g., messages, indications, information, and so on), respectively, and conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, or vehicle-to-vehicle (V2V) and/or vehicle-to-everything (V2X) transceivers.

The UE 302 and the base station 304 also include, at least in some cases, satellite signal receivers 330 and 370. The satellite signal receivers 330 and 370 may be connected to one or more antennas 336 and 376, respectively, and may provide means for receiving and/or measuring satellite positioning/communication signals 338 and 378, respectively. Where the satellite signal receivers 330 and 370 are satellite positioning system receivers, the satellite positioning/communication signals 338 and 378 may be global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. Where the satellite signal receivers 330 and 370 are non-terrestrial network (NTN) receivers, the satellite positioning/communication signals 338 and 378 may be communication signals (e.g., carrying control and/or user data) originating from a 5G network. The satellite signal receivers 330 and 370 may comprise any suitable hardware and/or software for receiving and processing satellite positioning/communication signals 338 and 378, respectively. The satellite signal receivers 330 and 370 may request information and operations as appropriate from the other systems, and, at least in some cases, perform calculations to determine locations of the UE 302 and the base station 304, respectively, using measurements obtained by any suitable satellite positioning system algorithm.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the one or more network transceivers 380 to communicate with other base stations 304 or network entities 306 over one or more wired or wireless backhaul links. As another example, the network entity 306 may employ the one or more network transceivers 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include sidelink ranging component 342, 388, and 398, respectively. The sidelink ranging component 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the sidelink ranging component 342, 388, and 398 may be external to the processors 332, 384, and 394 (e.g., part of a modem processing system, integrated with another processing system, etc.). Alternatively, the sidelink ranging component 342, 388, and 398 may be memory modules stored in the memories 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the sidelink ranging component 342, which may be, for example, part of the one or more WWAN transceivers 310, the memory 340, the one or more processors 332, or any combination thereof, or may be a standalone component. FIG. 3B illustrates possible locations of the sidelink ranging component 388, which may be, for example, part of the one or more WWAN transceivers 350, the memory 386, the one or more processors 384, or any combination thereof, or may be a standalone component. FIG. 3C illustrates possible locations of the sidelink ranging component 398, which may be, for example, part of the one or more network transceivers 390, the memory 396, the one or more processors 394, or any combination thereof, or may be a standalone component.

The UE 302 may include one or more sensors 344 coupled to the one or more processors 332 to provide means for sensing or detecting movement and/or orientation information that is independent of motion data derived from signals received by the one or more WWAN transceivers 310, the one or more short-range wireless transceivers 320, and/or the satellite signal receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the one or more processors 384 in more detail, in the downlink, IP packets from the network entity 306 may be provided to the processor 384. The one or more processors 384 may implement functionality for an RRC layer, a packet data convergence protocol (PDCP) layer, a radio link control (RLC) layer, and a medium access control (MAC) layer. The one or more processors 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the one or more processors 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the one or more processors 332, which implements Layer-3 (L3) and Layer-2 (L2) functionality.

In the uplink, the one or more processors 332 provides demultiplexing between transport and logical channels, packet reassembly, deciphering, header decompression, and control signal processing to recover IP packets from the core network. The one or more processors 332 are also responsible for error detection.

Similar to the functionality described in connection with the downlink transmission by the base station 304, the one or more processors 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the one or more processors 384.

In the uplink, the one or more processors 384 provides demultiplexing between transport and logical channels, packet reassembly, deciphering, header decompression, control signal processing to recover IP packets from the UE 302. IP packets from the one or more processors 384 may be provided to the core network. The one or more processors 384 are also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs. In particular, various components in FIGS. 3A to 3C are optional in alternative configurations and the various aspects include configurations that may vary due to design choice, costs, use of the device, or other considerations. For example, in case of FIG. 3A, a particular implementation of UE 302 may omit the WWAN transceiver(s) 310 (e.g., a wearable device or tablet computer or PC or laptop may have Wi-Fi and/or Bluetooth capability without cellular capability), or may omit the short-range wireless transceiver(s) 320 (e.g., cellular-only, etc.), or may omit the satellite signal receiver 330, or may omit the sensor(s) 344, and so on. In another example, in case of FIG. 3B, a particular implementation of the base station 304 may omit the WWAN transceiver(s) 350 (e.g., a Wi-Fi "hotspot" access point without cellular capability), or may omit the short-range wireless transceiver(s) 360 (e.g., cellular-only, etc.), or may omit the satellite receiver 370, and so on. For brevity, illustration of the various alternative configurations is not provided herein, but would be readily understandable to one skilled in the art.

The various components of the UE 302, the base station 304, and the network entity 306 may be communicatively coupled to each other over data buses 334, 382, and 392, respectively. In an aspect, the data buses 334, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memories 340, 386, and 396, the sidelink ranging component 342, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as WiFi).

Figure 4:
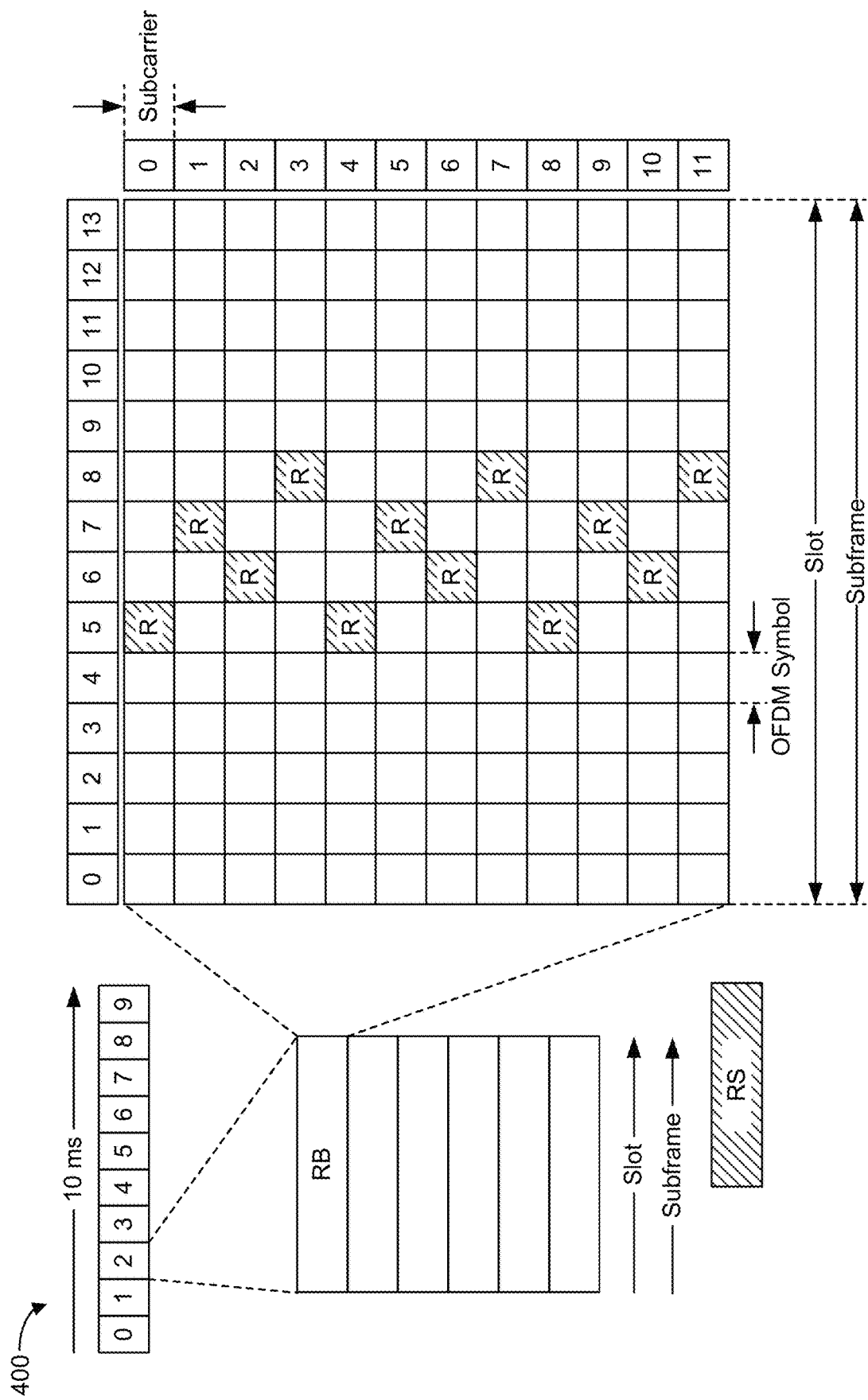
FIG. 4 is a diagram illustrating an example frame structure, according to aspects of the disclosure.

FIG. 4 is a diagram illustrating an example frame structure, according to aspects of the disclosure. Various frame structures may be used to support downlink and uplink transmissions between network nodes (e.g., base stations and UEs). FIG. 4 is a diagram 400 illustrating an example frame structure, according to aspects of the disclosure. The frame structure may be a downlink or uplink frame structure. Other wireless communications technologies may have different frame structures and/or different channels.

LTE, and in some cases NR, utilizes orthogonal frequency-division multiplexing (OFDM) on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kilohertz (kHz) and the minimum resource allocation (resource block) may be 12 subcarriers (or 180 kHz). Consequently, the nominal fast Fourier transform (FFT) size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing (SCS), symbol length, etc.). In contrast, NR may support multiple numerologies ($\mu$), for example, subcarrier spacings of 15 kHz ($\mu$=0), 30 kHz ($\mu$=1), 60 kHz ($\mu$=2), 120 kHz ($\mu$=3), and 240 kHz ($\mu$=4) or greater may be available. In each subcarrier spacing, there are 14 symbols per slot. For 15 kHz SCS ($\mu$=0), there is one slot per subframe, 10 slots per frame, the slot duration is 1 millisecond (ms), the symbol duration is 66.7 microseconds ($\mu$s), and the maximum nominal system bandwidth (in MHz) with a 4K FFT size is 50. For 30 kHz SCS ($\mu$=1), there are two slots per subframe, 20 slots per frame, the slot duration is 0.5 ms, the symbol duration is 33.3 $\mu$s, and the maximum nominal system bandwidth (in MHz) with a 4K FFT size is 100. For 60 kHz SCS ($\mu$=2), there are four slots per subframe, 40 slots per frame, the slot duration is 0.25 ms, the symbol duration is 16.7 $\mu$s, and the maximum nominal system bandwidth (in MHz) with a 4K FFT size is 200. For 120 kHz SCS ($\mu$=3), there are eight slots per subframe, 80 slots per frame, the slot duration is 0.125 ms, the symbol duration is 8.33 $\mu$s, and the maximum nominal system bandwidth (in MHz) with a 4K FFT size is 400. For 240 kHz SCS ($\mu$=4), there are 16 slots per subframe, 160 slots per frame, the slot duration is 0.0625 ms, the symbol duration is 4.17 $\mu$s, and the maximum nominal system bandwidth (in MHz) with a 4K FFT size is 800.

In the example of FIG. 4, a numerology of 15 kHz is used. Thus, in the time domain, a 10 ms frame is divided into 10 equally sized subframes of 1 ms each, and each subframe includes one time slot. In FIG. 4, time is represented horizontally (on the X axis) with time increasing from left to right, while frequency is represented vertically (on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIG. 4, for a normal cyclic prefix, an RB may contain 12 consecutive subcarriers in the frequency domain and seven consecutive symbols in the time domain, for a total of 84 REs. For an extended cyclic prefix, an RB may contain 12 consecutive subcarriers in the frequency domain and six consecutive symbols in the time domain, for a total of 72 REs. The number of bits carried by each RE depends on the modulation scheme.

Some of the REs may carry reference (pilot) signals (RS). The reference signals may include positioning reference signals (PRS), tracking reference signals (TRS), phase tracking reference signals (PTRS), cell-specific reference signals (CRS), channel state information reference signals (CSI-RS), demodulation reference signals (DMRS), primary synchronization signals (PSS), secondary synchronization signals (SSS), synchronization signal blocks (SSBs), sounding reference signals (SRS), etc., depending on whether the illustrated frame structure is used for uplink or downlink communication. FIG. 4 illustrates example locations of REs carrying a reference signal (labeled "R").

Figure 5:
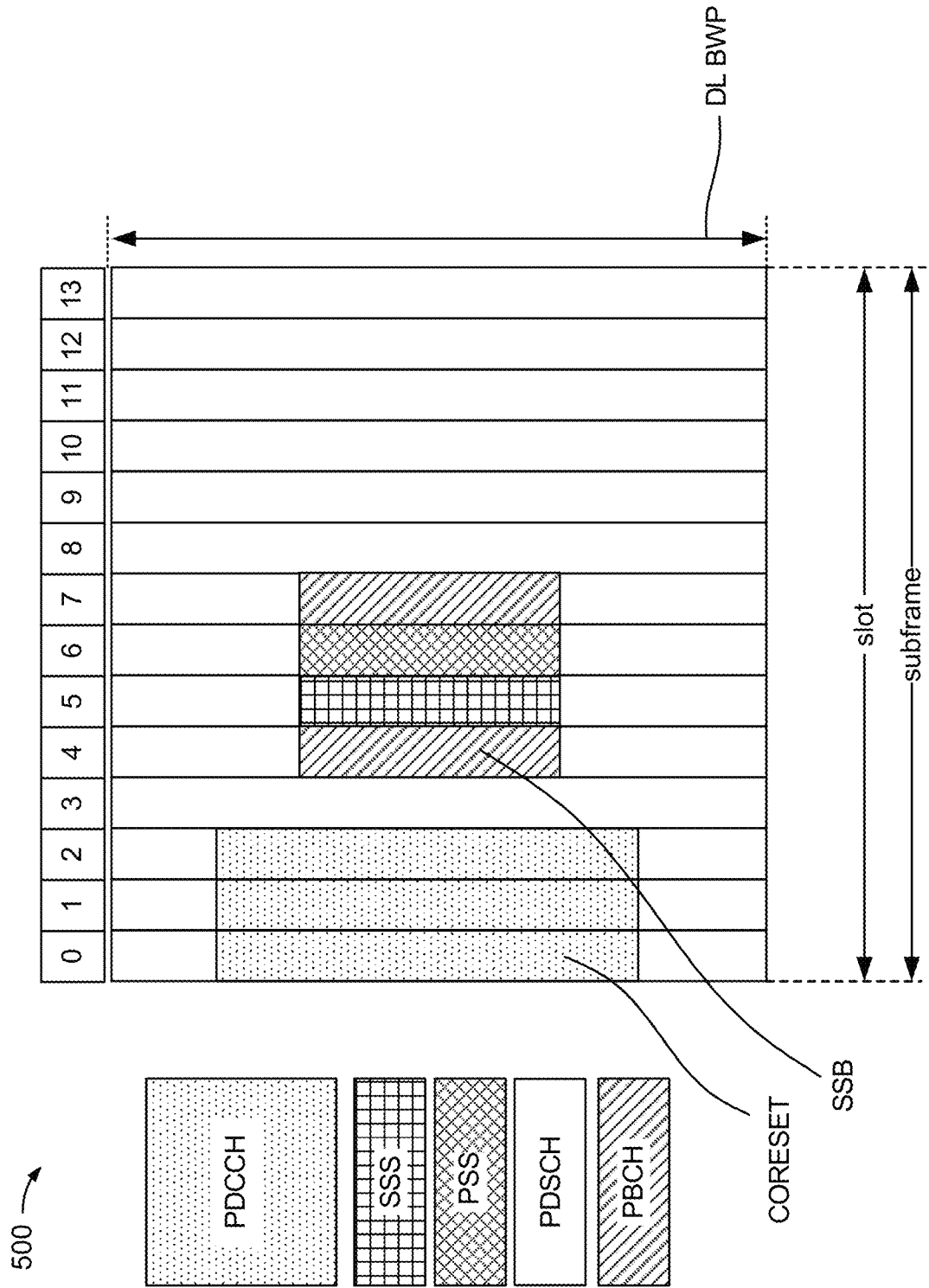
FIG. 5 is a diagram illustrating various downlink channels within an example downlink slot, according to aspects of the disclosure.

FIG. 5 is a diagram 500 illustrating various downlink channels within an example downlink slot. In FIG. 5, time is represented horizontally (on the X axis) with time increasing from left to right, while frequency is represented vertically (on the Y axis) with frequency increasing (or decreasing) from bottom to top. In the example of FIG. 5, a numerology of 15 kHz is used. Thus, in the time domain, the illustrated slot is one millisecond (ms) in length, divided into 14 symbols.

In NR, the channel bandwidth, or system bandwidth, is divided into multiple bandwidth parts (BWPs). A BWP is a contiguous set of RBs selected from a contiguous subset of the common RBs for a given numerology on a given carrier. Generally, a maximum of four BWPs can be specified in the downlink and uplink. That is, a UE can be configured with up to four BWPs on the downlink, and up to four BWPs on the uplink. Only one BWP (uplink or downlink) may be active at a given time, meaning the UE may only receive or transmit over one BWP at a time. On the downlink, the bandwidth of each BWP should be equal to or greater than the bandwidth of the SSB, but it may or may not contain the SSB.

Referring to FIG. 5, a primary synchronization signal (PSS) is used by a UE to determine subframe/symbol timing and a physical layer identity. A secondary synchronization signal (SSS) is used by a UE to determine a physical layer cell identity group number and radio frame timing. Based on the physical layer identity and the physical layer cell identity group number, the UE can determine a PCI. Based on the PCI, the UE can determine the locations of the aforementioned DL-RS. The physical broadcast channel (PBCH), which carries a master information block (MIB), may be logically grouped with the PSS and SSS to form an SSB (also referred to as an SS/PBCH). The MIB provides a number of RBs in the downlink system bandwidth and a system frame number (SFN). The physical downlink shared channel (PDSCH) carries user data, broadcast system information not transmitted through the PBCH, such as system information blocks (SIBs), and paging messages.

The physical downlink control channel (PDCCH) carries downlink control information (DCI) within one or more control channel elements (CCEs), each CCE including one or more RE group (REG) bundles (which may span multiple symbols in the time domain), each REG bundle including one or more REGs, each REG corresponding to 12 resource elements (one resource block) in the frequency domain and one OFDM symbol in the time domain. The set of physical resources used to carry the PDCCH/DCI is referred to in NR as the control resource set (CORESET). In NR, a PDCCH is confined to a single CORESET and is transmitted with its own DMRS. This enables UE-specific beamforming for the PDCCH.

In the example of FIG. 5, there is one CORESET per BWP, and the CORESET spans three symbols (although it may be only one or two symbols) in the time domain. Unlike LTE control channels, which occupy the entire system bandwidth, in NR, PDCCH channels are localized to a specific region in the frequency domain (i.e., a CORESET). Thus, the frequency component of the PDCCH shown in FIG. 5 is illustrated as less than a single BWP in the frequency domain. Note that although the illustrated CORESET is contiguous in the frequency domain, it need not be. In addition, the CORESET may span less than three symbols in the time domain.

The DCI within the PDCCH carries information about uplink resource allocation (persistent and non-persistent) and descriptions about downlink data transmitted to the UE, referred to as uplink and downlink grants, respectively. More specifically, the DCI indicates the resources scheduled for the downlink data channel (e.g., PDSCH) and the uplink data channel (e.g., physical uplink shared channel (PUSCH)). Multiple (e.g., up to eight) DCIs can be configured in the PDCCH, and these DCIs can have one of multiple formats. For example, there are different DCI formats for uplink scheduling, for downlink scheduling, for uplink transmit power control (TPC), etc. A PDCCH may be transported by 1, 2, 4, 8, or 16 CCEs in order to accommodate different DCI payload sizes or coding rates.

Figure 6:
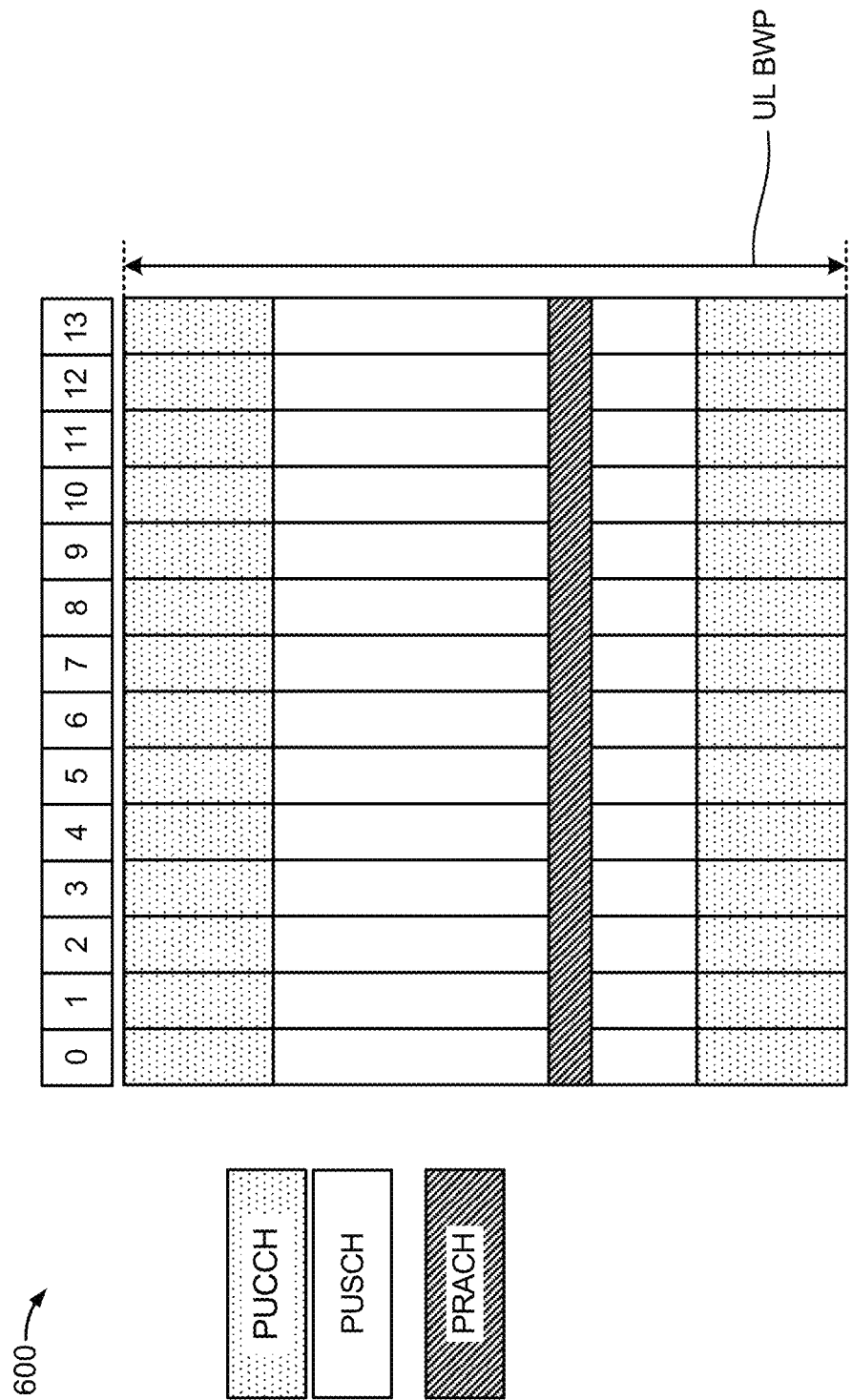
FIG. 6 is a diagram illustrating various uplink channels within an example uplink slot, according to aspects of the disclosure.

FIG. 6 is a diagram 600 illustrating various uplink channels within an example uplink slot. In FIG. 6, time is represented horizontally (on the X axis) with time increasing from left to right, while frequency is represented vertically (on the Y axis) with frequency increasing (or decreasing) from bottom to top. In the example of FIG. 6, a numerology of 15 kHz is used. Thus, in the time domain, the illustrated slot is one millisecond (ms) in length, divided into 14 symbols.

A random-access channel (RACH), also referred to as a physical random-access channel (PRACH), may be within one or more slots within a frame based on the PRACH configuration. The PRACH may include six consecutive RB pairs within a slot. The PRACH allows the UE to perform initial system access and achieve uplink synchronization. A physical uplink control channel (PUCCH) may be located on edges of the uplink system bandwidth. The PUCCH carries uplink control information (UCI), such as scheduling requests, CSI reports, a channel quality indicator (CQI), a precoding matrix indicator (PMI), a rank indicator (RI), and HARQ ACK/NACK feedback. The physical uplink shared channel (PUSCH) carries data, and may additionally be used to carry a buffer status report (BSR), a power headroom report (PHR), and/or UCI.

Figure 7A:
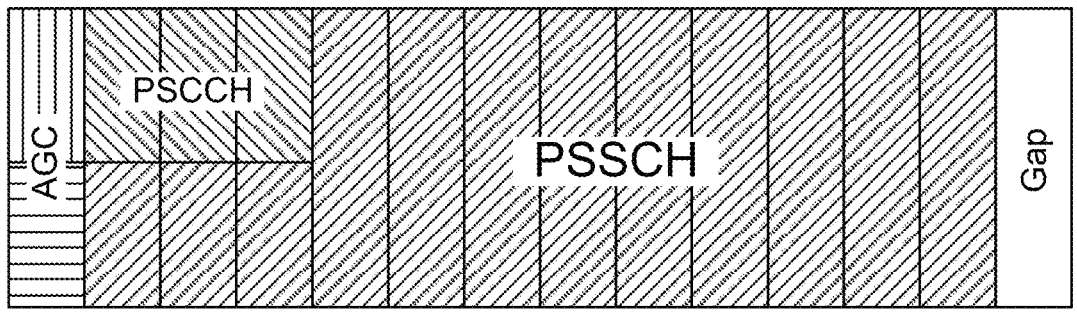
FIGS. 7A and 7B are diagrams of example sidelink slot structures with and without feedback resources, according to aspects of the disclosure.
Figure 7B:
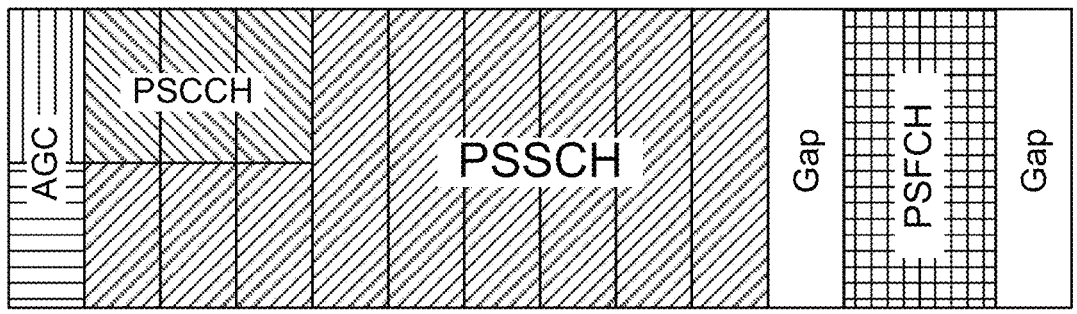

FIGS. 7A and 7B are diagrams of example sidelink slot structures with and without feedback resources, according to aspects of the disclosure.

Sidelink communication takes place in transmission or reception resource pools. In the frequency domain, the minimum resource allocation unit is a sub-channel (e.g., a collection of consecutive PRBs in the frequency domain). In the time domain, resource allocation is in one slot intervals. However, some slots are not available for sidelink, and some slots contain feedback resources. In addition, sidelink resources can be (pre)configured to occupy fewer than the 14 symbols of a slot.

Sidelink resources are configured at the radio resource control (RRC) layer. The RRC configuration can be by pre-configuration (e.g., preloaded on the UE) or configuration (e.g., from a serving base station).

NR sidelinks support hybrid automatic repeat request (HARQ) retransmission. FIG. 7A is a diagram 700 of an example slot structure without feedback resources, according to aspects of the disclosure. In the example of FIG. 7A, time is represented horizontally and frequency is represented vertically. In the time domain, the length of each block is one orthogonal frequency division multiplexing (OFDM) symbol, and the 14 symbols make up a slot. In the frequency domain, the height of each block is one sub-channel. Currently, the (pre)configured sub-channel size can be selected from the set of {10, 15, 20, 25, 50, 75, 100} physical resource blocks (PRBs).

For a sidelink slot, the first symbol is a repetition of the preceding symbol and is used for automatic gain control (AGC) setting. This is illustrated in FIG. 7A by the vertical and horizontal hashing. As shown in FIG. 7A, for sidelink, the physical sidelink control channel (PSCCH) and the physical sidelink shared channel (PSSCH) are transmitted in the same slot. Similar to the physical downlink control channel (PDCCH), the PSCCH carries control information about sidelink resource allocation and descriptions about sidelink data transmitted to the UE. Likewise, similar to the physical downlink shared channel (PDSCH), the PSSCH carries user date for the UE. In the example of FIG. 7A, the PSCCH occupies half the bandwidth of the sub-channel and only three symbols. Finally, a gap symbol is present after the PSSCH.

FIG. 7B is a diagram 750 of an example slot structure with feedback resources, according to aspects of the disclosure. In the example of FIG. 7B, time is represented horizontally and frequency is represented vertically. In the time domain, the length of each block is one OFDM symbol, and the 14 symbols make up a slot. In the frequency domain, the height of each block is one sub-channel.

The slot structure illustrated in FIG. 7B is similar to the slot structure illustrated in FIG. 7A, except that the slot structure illustrated in FIG. 7B includes feedback resources. Specifically, two symbols at the end of the slot have been dedicated to the physical sidelink feedback channel (PSFCH). The first PSFCH symbol is a repetition of the second PSFCH symbol for AGC setting. In addition to the gap symbol after the PSSCH, there is a gap symbol after the two PSFCH symbols. Currently, resources for the PSFCH can be configured with a periodicity selected from the set of {0, 1, 2, 4} slots.

Figure 8:
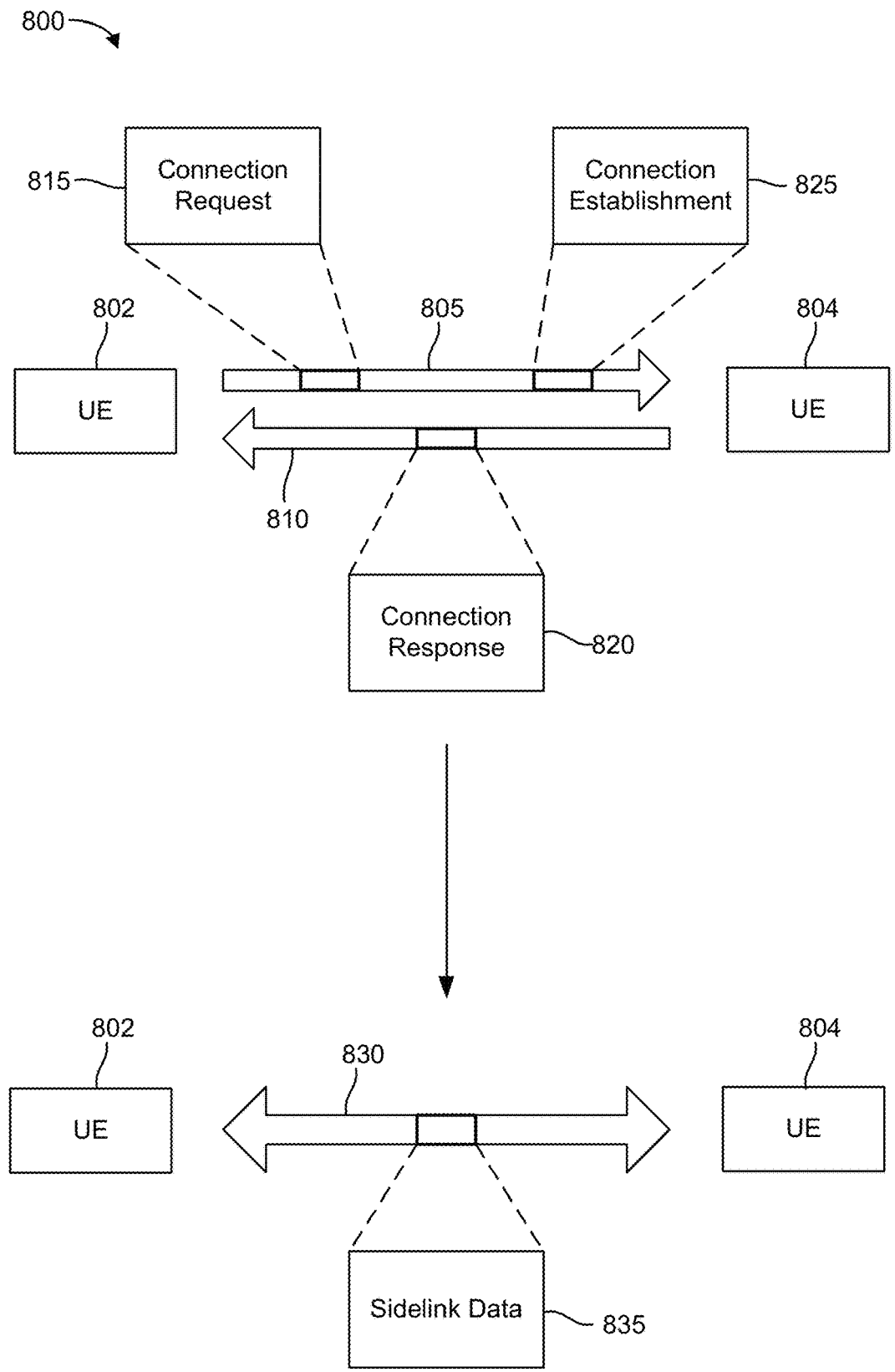
FIG. 8 illustrates an example of a wireless communications system that supports unicast sidelink establishment, according to aspects of the disclosure.

FIG. 8 illustrates an example of a wireless communications system 800 that supports wireless unicast sidelink establishment, according to aspects of the disclosure. In some examples, wireless communications system 800 may implement aspects of wireless communications systems 100, 200, and 250. Wireless communications system 800 may include a first UE 802 and a second UE 804, which may be examples of any of the UEs described herein. As specific examples, UEs 802 and 804 may correspond to V-UEs 160 in FIG. 1.

In the example of FIG. 8, the UE 802 may attempt to establish a unicast connection over a sidelink with the UE 804, which may be a V2X sidelink between the UE 802 and UE 804. As specific examples, the established sidelink connection may correspond to sidelinks 162 and/or 168 in FIG. 1. The sidelink connection may be established in an omni-directional frequency range (e.g., FR1) and/or a mmW frequency range (e.g., FR2). In some cases, the UE 802 may be referred to as an initiating UE that initiates the sidelink connection procedure, and the UE 804 may be referred to as a target UE that is targeted for the sidelink connection procedure by the initiating UE.

For establishing the unicast connection, access stratum (AS) (a functional layer in the UMTS and LTE protocol stacks between the RAN and the UE that is responsible for transporting data over wireless links and managing radio resources, and which is part of Layer 2) parameters may be configured and negotiated between the UE 802 and UE 804. For example, a transmission and reception capability matching may be negotiated between the UE 802 and UE 804. Each UE may have different capabilities (e.g., transmission and reception, 64 quadrature amplitude modulation (QAM), transmission diversity, carrier aggregation (CA), supported communications frequency band(s), etc.). In some cases, different services may be supported at the upper layers of corresponding protocol stacks for UE 802 and UE 804. Additionally, a security association may be established between UE 802 and UE 804 for the unicast connection. Unicast traffic may benefit from security protection at a link level (e.g., integrity protection). Security requirements may differ for different wireless communications systems. For example, V2X and Uu systems may have different security requirements (e.g., Uu security does not include confidentiality protection). Additionally, IP configurations (e.g., IP versions, addresses, etc.) may be negotiated for the unicast connection between UE 802 and UE 804.

In some cases, UE 804 may create a service announcement (e.g., a service capability message) to transmit over a cellular network (e.g., cV2X) to assist the sidelink connection establishment. Conventionally, UE 802 may identify and locate candidates for sidelink communications based on a basic service message (BSM) broadcasted unencrypted by nearby UEs (e.g., UE 804). The BSM may include location information, security and identity information, and vehicle information (e.g., speed, maneuver, size, etc.) for the corresponding UE. However, for different wireless communications systems (e.g., D2D or V2X communications), a discovery channel may not be configured so that UE 802 is able to detect the BSM(s). Accordingly, the service announcement transmitted by UE 804 and other nearby UEs (e.g., a discovery signal) may be an upper layer signal and broadcasted (e.g., in an NR sidelink broadcast). In some cases, the UE 804 may include one or more parameters for itself in the service announcement, including connection parameters and/or capabilities it possesses. The UE 802 may then monitor for and receive the broadcasted service announcement to identify potential UEs for corresponding sidelink connections. In some cases, the UE 802 may identify the potential UEs based on the capabilities each UE indicates in their respective service announcements.

The service announcement may include information to assist the UE 802 (e.g., or any initiating UE) to identify the UE transmitting the service announcement (UE 804 in the example of FIG. 8). For example, the service announcement may include channel information where direct communication requests may be sent. In some cases, the channel information may be RAT-specific (e.g., specific to LTE or NR) and may include a resource pool within which UE 802 transmits the communication request. Additionally, the service announcement may include a specific destination address for the UE (e.g., a Layer 2 destination address) if the destination address is different from the current address (e.g., the address of the streaming provider or UE transmitting the service announcement). The service announcement may also include a network or transport layer for the UE 802 to transmit a communication request on. For example, the network layer (also referred to as "Layer 3" or "L3") or the transport layer (also referred to as "Layer 4" or "L4") may indicate a port number of an application for the UE transmitting the service announcement. In some cases, no IP addressing may be needed if the signaling (e.g., PC5 signaling) carries a protocol (e.g., a real-time transport protocol (RTP)) directly or gives a locally-generated random protocol. Additionally, the service announcement may include a type of protocol for credential establishment and QoS-related parameters.

After identifying a potential sidelink connection target (UE 804 in the example of FIG. 8), the initiating UE (UE 802 in the example of FIG. 8) may transmit a connection request 815 to the identified target UE 804. In some cases, the connection request 815 may be a first RRC message transmitted by the UE 802 to request a unicast connection with the UE 804 (e.g., an "RRCSetupRequest" message). For example, the unicast connection may utilize the PC5 interface for the sidelink, and the connection request 815 may be an RRC connection setup request message. Additionally, the UE 802 may use a sidelink signaling radio bearer 805 to transport the connection request 815.

After receiving the connection request 815, the UE 804 may determine whether to accept or reject the connection request 815. The UE 804 may base this determination on a transmission/reception capability, an ability to accommodate the unicast connection over the sidelink, a particular service indicated for the unicast connection, the contents to be transmitted over the unicast connection, or a combination thereof. For example, if the UE 802 wants to use a first RAT to transmit or receive data, but the UE 804 does not support the first RAT, then the UE 804 may reject the connection request 815. Additionally or alternatively, the UE 804 may reject the connection request 815 based on being unable to accommodate the unicast connection over the sidelink due to limited radio resources, a scheduling issue, etc. Accordingly, the UE 804 may transmit an indication of whether the request is accepted or rejected in a connection response 820. Similar to the UE 802 and the connection request 815, the UE 804 may use a sidelink signaling radio bearer 810 to transport the connection response 820. Additionally, the connection response 820 may be a second RRC message transmitted by the UE 804 in response to the connection request 815 (e.g., an "RRCResponse" message).

In some cases, sidelink signaling radio bearers 805 and 810 may be the same sidelink signaling radio bearer or may be separate sidelink signaling radio bearers. Accordingly, a radio link control (RLC) layer acknowledged mode (AM)

may be used for sidelink signaling radio bearers 805 and 810. A UE that supports the unicast connection may listen on a logical channel associated with the sidelink signaling radio bearers. In some cases, the AS layer (i.e., Layer 2) may pass information directly through RRC signaling (e.g., control plane) instead of a V2X layer (e.g., data plane).

If the connection response 820 indicates that the UE 804 accepted the connection request 815, the UE 802 may then transmit a connection establishment 825 message on the sidelink signaling radio bearer 805 to indicate that the unicast connection setup is complete. In some cases, the connection establishment 825 may be a third RRC message (e.g., an "RRCSetupComplete" message). Each of the connection request 815, the connection response 820, and the connection establishment 825 may use a basic capability when being transported from one UE to the other UE to enable each UE to be able to receive and decode the corresponding transmission (e.g., the RRC messages).

Additionally, identifiers may be used for each of the connection request 815, the connection response 820, and the connection establishment 825. For example, the identifiers may indicate which UE 802/804 is transmitting which message and/or for which UE 802/804 the message is intended. For physical (PHY) layer channels, the RRC signaling and any subsequent data transmissions may use the same identifier (e.g., Layer 2 IDs). However, for logical channels, the identifiers may be separate for the RRC signaling and for the data transmissions. For example, on the logical channels, the RRC signaling and the data transmissions may be treated differently and have different acknowledgement (ACK) feedback messaging. In some cases, for the RRC messaging, a physical layer ACK may be used for ensuring the corresponding messages are transmitted and received properly.

One or more information elements may be included in the connection request 815 and/or the connection response 820 for UE 802 and/or UE 804, respectively, to enable negotiation of corresponding AS layer parameters for the unicast connection. For example, the UE 802 and/or UE 804 may include packet data convergence protocol (PDCP) parameters in a corresponding unicast connection setup message to set a PDCP context for the unicast connection. In some cases, the PDCP context may indicate whether or not PDCP duplication is utilized for the unicast connection. Additionally, the UE 802 and/or UE 804 may include RLC parameters when establishing the unicast connection to set an RLC context for the unicast connection. For example, the RLC context may indicate whether an AM (e.g., a reordering timer (t-reordering) is used) or an unacknowledged mode (UM) is used for the RLC layer of the unicast communications.

Additionally, the UE 802 and/or UE 804 may include medium access control (MAC) parameters to set a MAC context for the unicast connection. In some cases, the MAC context may enable resource selection algorithms, a hybrid automatic repeat request (HARQ) feedback scheme (e.g., ACK or negative ACK (NACK) feedback), parameters for the HARQ feedback scheme, carrier aggregation, or a combination thereof for the unicast connection. Additionally, the UE 802 and/or UE 804 may include PHY layer parameters when establishing the unicast connection to set a PHY layer context for the unicast connection. For example, the PHY layer context may indicate a transmission format (unless transmission profiles are included for each UE 802/804) and a radio resource configuration (e.g., bandwidth part (BWP), numerology, etc.) for the unicast connection. These information elements may be supported for different frequency range configurations (e.g., FR1 and FR2).

In some cases, a security context may also be set for the unicast connection (e.g., after the connection establishment 825 message is transmitted). Before a security association (e.g., security context) is established between the UE 802 and UE 804, the sidelink signaling radio bearers 805 and 810 may not be protected. After a security association is established, the sidelink signaling radio bearers 805 and 810 may be protected. Accordingly, the security context may enable secure data transmissions over the unicast connection and the sidelink signaling radio bearers 805 and 810. Additionally, IP layer parameters (e.g., link-local IPv4 or IPv6 addresses) may also be negotiated. In some cases, the IP layer parameters may be negotiated by an upper layer control protocol running after RRC signaling is established (e.g., the unicast connection is established). As noted above, the UE 804 may base its decision on whether to accept or reject the connection request 815 on a particular service indicated for the unicast connection and/or the contents to be transmitted over the unicast connection (e.g., upper layer information). The particular service and/or contents may be also indicated by an upper layer control protocol running after RRC signaling is established.

After the unicast connection is established, the UE 802 and UE 804 may communicate using the unicast connection over a sidelink 830, where sidelink data 835 is transmitted between the two UEs 802 and 804. The sidelink 830 may correspond to sidelinks 162 and/or 168 in FIG. 1. In some cases, the sidelink data 835 may include RRC messages transmitted between the two UEs 802 and 804. To maintain this unicast connection on sidelink 830, UE 802 and/or UE 804 may transmit a keep alive message (e.g., "RRCLinkAlive" message, a fourth RRC message, etc.). In some cases, the keep alive message may be triggered periodically or on-demand (e.g., event-triggered). Accordingly, the triggering and transmission of the keep alive message may be invoked by UE 802 or by both UE 802 and UE 804. Additionally or alternatively, a MAC control element (CE) (e.g., defined over sidelink 830) may be used to monitor the status of the unicast connection on sidelink 830 and maintain the connection. When the unicast connection is no longer needed (e.g., UE 802 travels far enough away from UE 804), either UE 802 and/or UE 804 may start a release procedure to drop the unicast connection over sidelink 830. Accordingly, subsequent RRC messages may not be transmitted between UE 802 and UE 804 on the unicast connection.

Ranging, also known as relative positioning, determines a distance between two objects rather than an absolute location. Ranging is very important for vehicle-to-anything (V2X) applications, e.g., to avoid roadside hazards, vulnerable road users (e.g., a pedestrian, jogger, or cyclist with a mobile phone), and collisions with other vehicles. In a common scenario, two UEs, typically two vehicle UEs (VUEs), or a VUE and a road-side unit (RSU), have set up a ranging session in which each UE periodically transmits a V2X safety message that includes the UE's location (e.g., geographic latitude and longitude), so that each UE will know roughly the other UEs presence. In this manner, a VUE can determine its absolute location using GNSS (GPS) and be notified of another VUE's absolute location via a V2X safety message transmitted by the other VUE. Range can be calculated as the distance between the two absolute locations. In this scenario, there is a presumption that all V2X devices will have GNSS capability. However, GNSS may not always be available (e.g., entirely absent or highly attenuated), in which case sidelink (SL) positioning can be used to determine range between two VUEs. SL ranging may be based on transmission and measurement of sidelink positioning reference signals (SL-PRSs).

Figure 9:
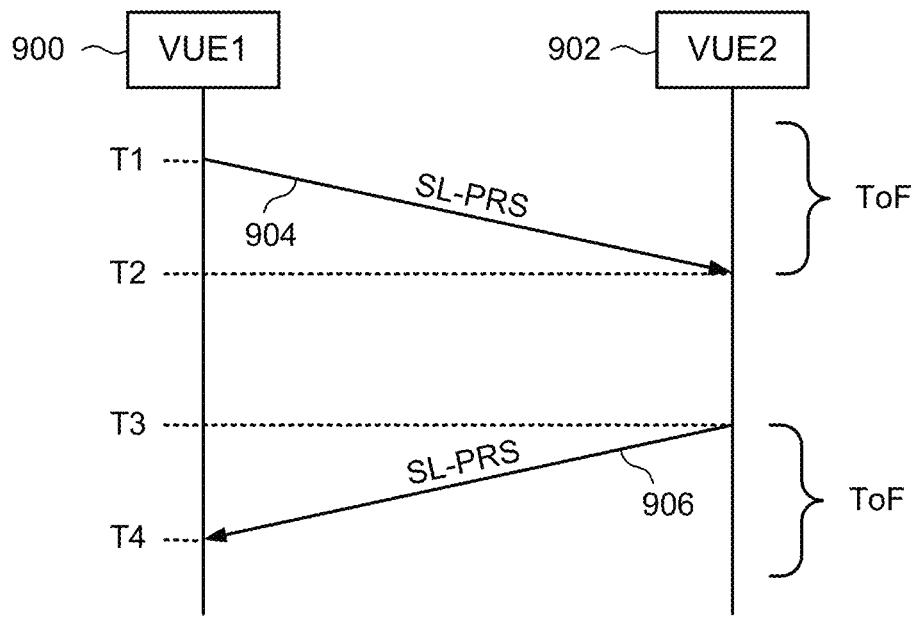
FIG. 9 is a signaling and event diagram for ranging based on calculation of round trip time (RTT) using sidelink (SL) positioning reference signals, according to aspects of the disclosure.

FIG. 9 is a signaling and event diagram for ranging based on calculation of round trip time (RTT) using SL-PRS signals, according to aspects of the disclosure. FIG. 9 illustrates calculation of a range between two VUEs, VUE1 900 and VUE2 902, based on determining values of time of flight (ToF). At time T1, VUE1 900 sends a first SL-PRS 904 to VUE2 902, which receives the first SL-PRS 904 at time T2. At time T3, VUE2 sends a second SL-PRS 906 to VUE1 900, which receives the second SL-PRS 906 at time T4. In some aspects, VUE2 902 notifies VUE1 900 of the values of T2 and T3. The RTT can then be calculated as (T4−T1)−(T3−T2), and the ToF will be RTT/2. The distance between VUE1 900 and VUE2 902 can be calculated based on ToF and the speed of propagation of the radio wave in air. In this manner, SL ranging can enable certain V2X services even when GNSS is not available or is available but not reliable enough.

However, SL ranging performance may depend on radio propagation conditions. Ranging may be more accurate if the radio channel between UEs has a line-of-sight (LOS) path. If there is no LOS path between UEs, e.g., if the direct LOS path is blocked by obstacles, the ranging may be less accurate. For V2X applications, where accuracy is critical, SL positioning needs at least one line-of-sight (LOS) communication path between the VUEs. This is not always true. For example, two cars approaching a common intersection surrounded by buildings and other RF obstacles may not have a LOS communication path between them. Moreover, GNSS along may not be accurate enough for autonomous vehicles to avoid collisions with other vehicles. For example, V2X autonomous driving use cases need sub-meter location accuracy, which cannot be achieved without a LOS path between the UEs.

To overcome the problems associated with sidelink ranging scenarios in which two UEs do not have a LOS path between them, the following techniques for sidelink ranging with RSU assistance are herein provided. These techniques take advantage of the fact that RSUs tend to be deployed in intersections or other locations specifically chosen so that the RSU is very likely to have good LOS paths to all UEs on or near a road. That is, even when two VUEs approaching the same intersection do not have a LOS path to each other, each will likely have an LOS path to the RSU.

Figure 10:
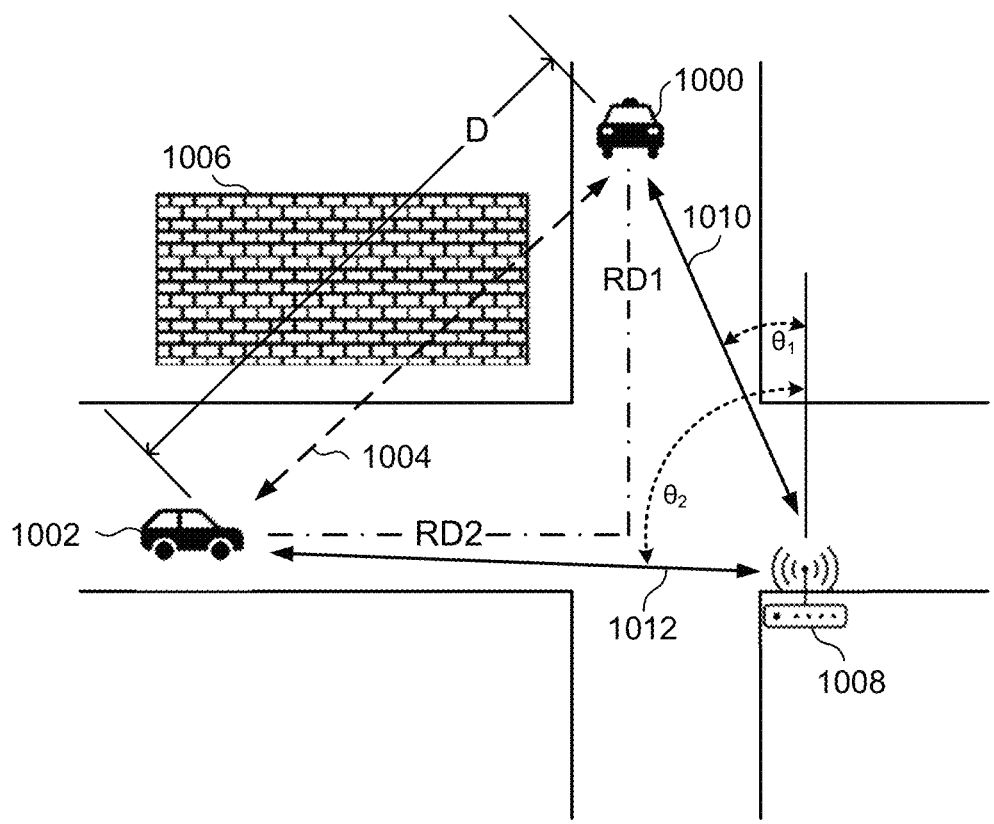
FIG. 10 illustrates sidelink ranging with road-side unit (RSU) assistance, according to aspects of the disclosure.

FIG. 10 illustrates sidelink ranging with RSU assistance, according to aspects of the disclosure. In FIG. 10, a first UE, e.g., VUE 1000, and a second UE, e.g., VUE 1002, have no LOS path 1004 between them because of an obstacle 1006, but can instead enlist assistance from an RSU 1008, which has a LOS path 1010 to VUE 1000 and a LOS path 1012 to VUE 1002. When RSU 1008 is a BS-type RSU, RSU-UE communications may be referred to as vehicle-to-network (V2N) communications. For example, the RSU 1008 may be deployed at the intersection, e.g., to broadcast traffic information, to help UEs with sidelink communications, etc. Alternatively, the RSU 1008 may be considered as another UE, e.g., RSU-UE communications may be via sidelink, in which case RSU-UE communication may be referred to as vehicle-to-infrastructure (V2I) communications.

In the example shown in FIG. 10, the RSU 1008 is enabled to assist sidelink ranging between VUE1 1000 and VUE2 1002, which may be performing RTT-based sidelink ranging as shown in FIG. 9. The RSU 1008 may participate in the ranging if needed, e.g., based on a determination of need by the RSU 1008 or in response to a request from VUE1 1000 or VUE2 1002. With participation by the RSU 1008, a straight-line distance between VUE1 1000 and VUE2 1002 can be derived based on distance between VUE1 1000 and RSU 1008 and the distance between VUE2 1002 and RSU 1008. Moreover, a road distance or a "Manhattan distance" between the two VUEs can be determined, which may be more useful in certain scenarios, such as determining the location of a possible road collision.

Figure 11A:
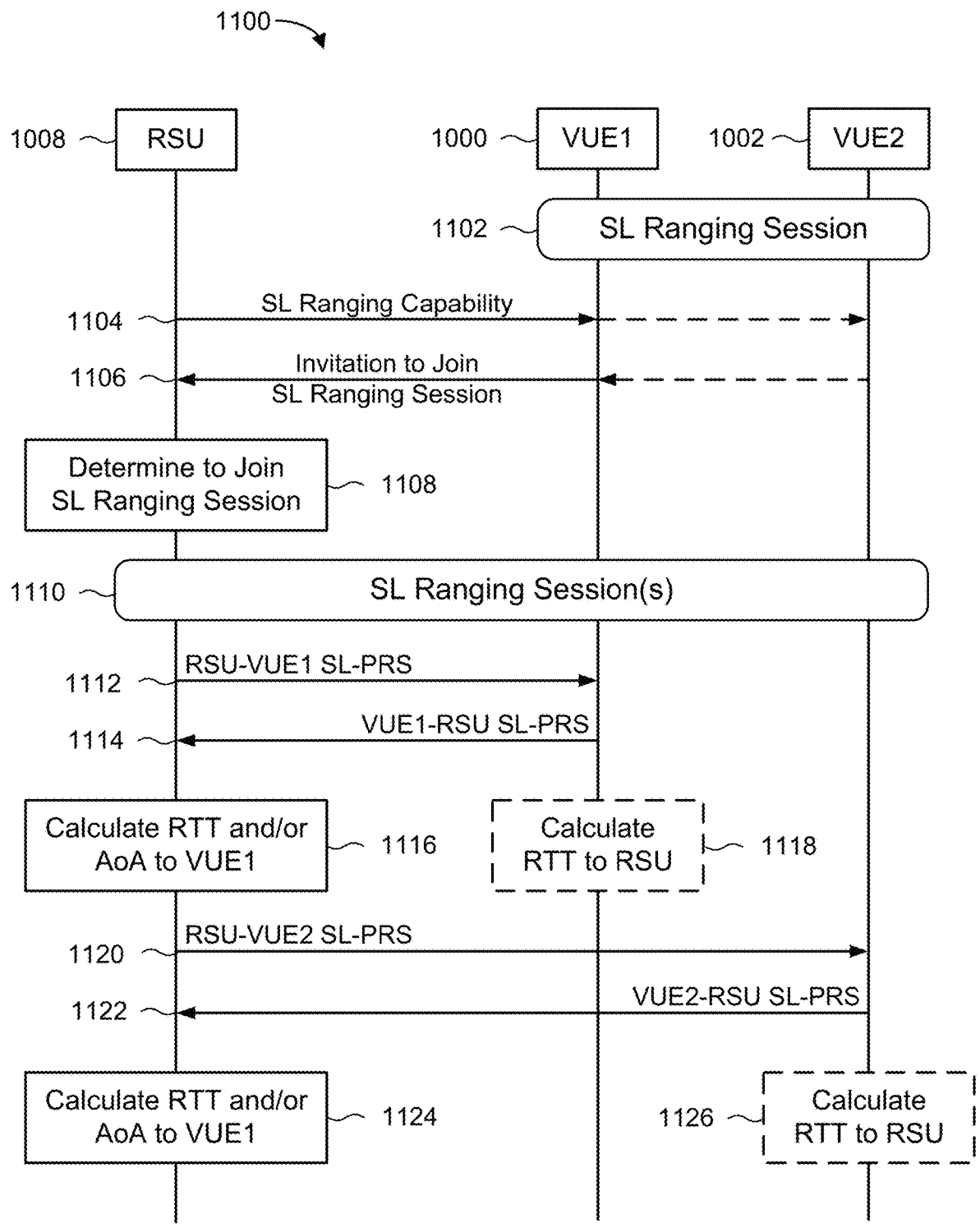
FIGS. 11A, 11B, and 11C are signal and event diagrams illustrating portions of a process for SL ranging with RSU assistance, according to aspects of the disclosure.
Figure 11B:
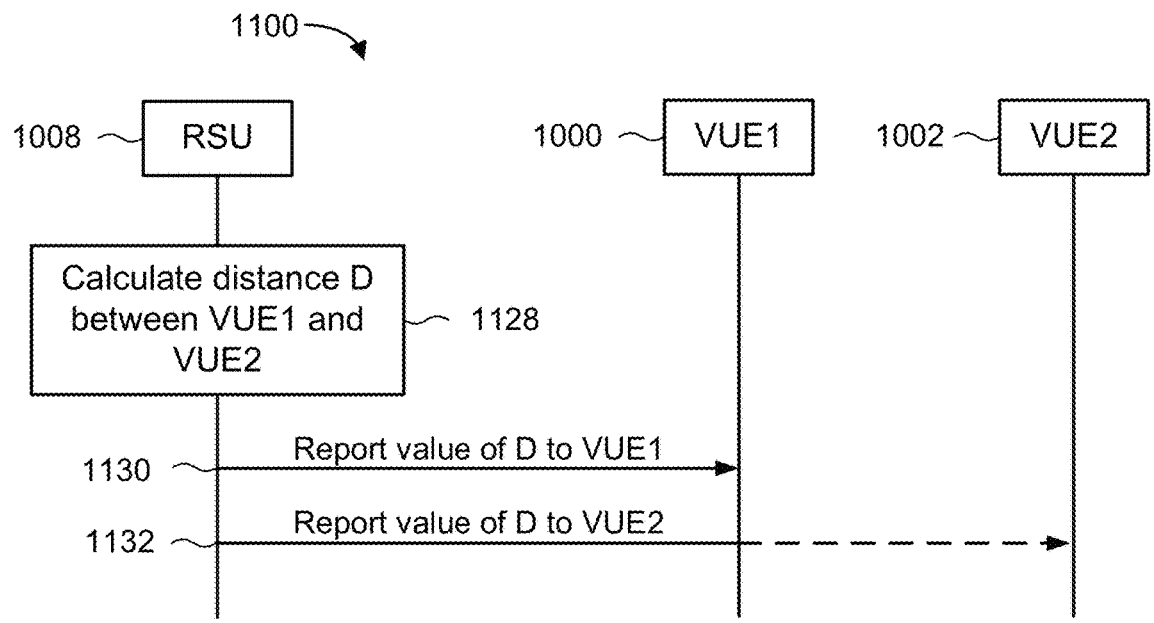
Figure 11C:
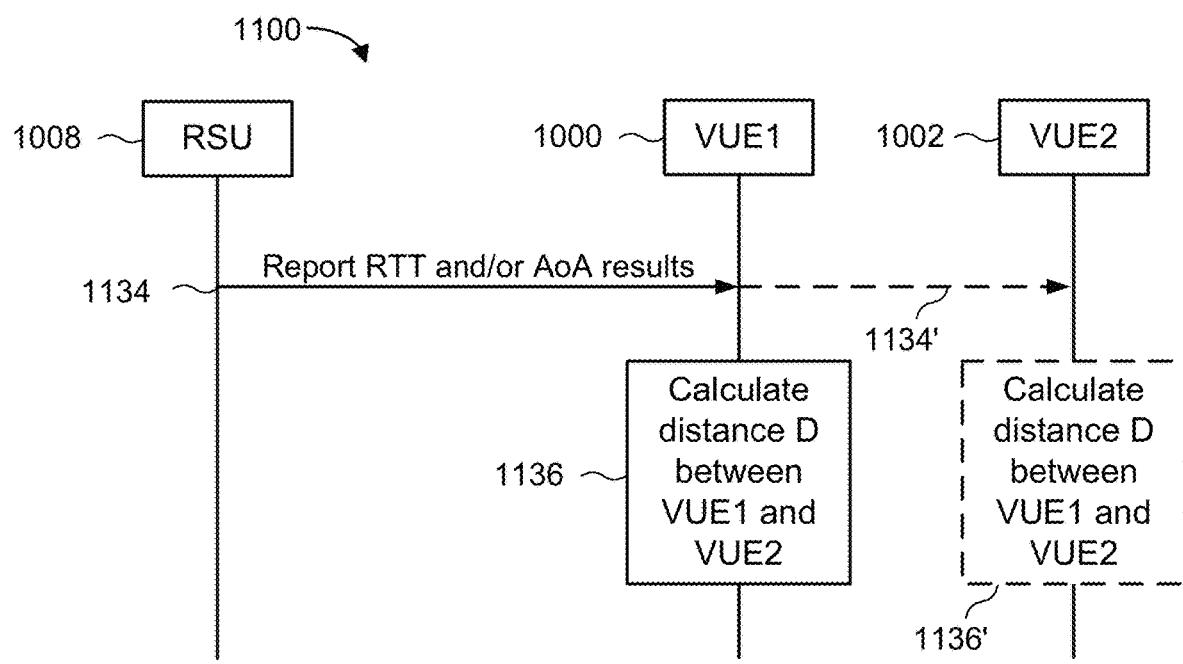

FIG. 11A, FIG. 11B, and FIG. 11C are signal and event diagrams illustrating portions of a process 1100 for SL ranging with RSU assistance, according to aspects of the disclosure. In the example illustrated in FIG. 11A, VUE1 1000 and VUE2 1002 have already established a sidelink ranging session 1102 between them, and thus may be referred to hereinafter as being peer UEs. RSU 1008 announces its SL ranging capacity (message 1104), which is received by VUE1 1000 and in some aspects may also be received by VUE2 1002. For example, the RSU may send broadcast transmissions over sidelink to indicate that it is capable to do SL ranging, or is capable to assist ranging between other UEs.

In some aspects, a UE may proactively request an RSU to join an existing ranging session, e.g., upon detection of the RSU, one or both of the UEs may send a request to the RSU. For example, in FIG. 11A, VUE1 1000 receives message 1104 and determines that the RSU 1008 has SL ranging capability. In some aspects, VUE1 1000 may be configured to always request RSU assistance when it detects an RSU with SL ranging capability, such as RSU 1008.

In other aspects, VUE1 1000 may make its own determination whether or not to request assistance from an RSU with SL ranging capability. For example, VUE1 1000 may determine whether or not to request assistance from RSU 1008 based on the location of RSU 1008, e.g., based on its geographic latitude and longitude, based on its location at the intersection of specific roads, etc.; VUE1 1000 may determine that RSU 1008 is in a good location for SL ranging. In some aspects, a UE may determine to request assistance from a known RSU based on a UE application layer indication—e.g., the application layer may indicate that the UE is at/close to an intersection, or in an area that RSU assistance is needed; e.g., UE's rough location may be available, based on this information and map data, V2X application may determine that RSU assistance is needed. In some aspects, a UE may determine to request assistance from a known RSU based on LOS/NLOS detection—e.g., the UE may be able to determine if path between itself and its peer is LOS or NLOS, either based on SL PRS measurement, or based on other means. The UE may request RSU assistance if the path to the peer UE is determined to be NLOS.

In the example illustrated in FIG. 11A, VUE1 1000 sends to RSU 1008 an invitation (message 1106) to join the existing ranging session 1102 (or to create a new SL ranging session), in which case the RSU 1008 may send a response to the requesting UE, e.g., VUE1 1000. In some aspects, the request may explicitly indicate that the RSU's participation will be to assist with ranging between the two UEs. It is noted that either VUE can be the requesting entity, e.g., the invitation can be sent by the head UE, the initiator UE, the consumer of the range information, the UE initiation the range session, and so on.

In some aspects, VU2 1002 may also send such an invitation, in which case the RSU 1008 may check the IDs included within the requests to determine that the two VUEs are associated with each other (e.g., are in a joint SL ranging session), and join only when both VUEs in a joint SL ranging session have requested participation in that session by the RSU 1008. Example IDs include, but are not limited to, a ranging session ID shared by both VUEs, a destination ID shared by both VUEs, a destination ID which is mapped from a peer UE's source ID, and a source ID.

In yet other aspects, the RSU 1008 may proactively request to create or join a ranging session with VUE1 1000 and VUE2 1002, even if it has not received an invitation to do so from VUE1 1000 or VUE2 1002.

At block 1108, the RSU 1008 determines whether or not to join or create an SL ranging session with VUE1 1000 and VUE2 1002. For example, the RSU 1008 may determine to join or create an SL ranging session with two VUEs only if it has a LOS path to each VUE, which the RSU 1008 may determine based measurement of signals from each VUE, sensor input, or other means. The determination may also be made based on other information available to the RSU 1008, such as knowledge of the presence of obstacles between the two VUEs, etc.

In the example shown in FIG. 11A, the RSU 1008 accepts the invitation(s) to join an SL ranging session 1110 with VUE1 1000 and VUE2 1002. In some aspects, VUE1 1000, VUE2 1002, and the RSU 1008 may form a group or establish a ranging session, based on sidelink message exchange between them (e.g., based on a handover procedure).

The 3 devices transmit SL PRS and perform SL PRS measurements. In the example shown in FIG. 11A, the RSU 1008 sends an SL-PRS 1112 to the VUE1 1000, and the VUE1 1000 sends an SL-PRS 1114 to the RSU 1008. At block 1116, the RSU 1008 then calculates an RTT value, an AoA for the SL-PRS from the VUE1 1000, or both, associated with the VUE1 1000. In some aspects, the VUE1 1000 may also calculate an RTT to the RSU 1008 (optional block 1118). If the VUE1 1000 has the capability to do so, it may also calculate an AoA for the SL-PRS from the RSU 1008.

In the example shown in FIG. 11A, the RSU 1008 sends an SL-PRS 1120 to the VUE2 1002, and the VUE2 1002 sends an SL-PRS 1122 to the RSU 1008. At block 1124, the RSU 1008 then calculates an RTT value, an AoA for the SL-PRS from the VUE2 1002, or both, associated with the VUE2 1002. In some aspects, the VUE2 1002 may also calculate an RTT to the RSU 1008 (optional block 1126). If the VUE2 1002 has the capability to do so, it may also calculate an AoA for the SL-PRS from the RSU 1008.

As shown in FIG. 11B, in some aspects, the process 1100 may continue with the RSU 1008 calculating the distance D between VUE1 1000 and VUE2 1002 (block 1128), reporting the value of D to the VUE1 1000 (message 1130) and reporting the value of D to the VUE2 1002 (message 1132). Distance D may be calculated as a straight line distance between the two VUEs, as a road distance between the two VUEs, or both.

As shown in FIG. 11C, in some aspects, the process 1100 may continue with the RSU 1008 reporting the measurement result (e.g., RTT values, AoA values, etc.) to one of the VUEs, e.g., to the VUE1 1000 (message 1134), and the VUE1 1000 calculates the distance D between itself and the VUE2 1002 (block 1136). In some aspects, the VUE2 1002 also receives the measurements results (message 1134', which may be the same transmission as message 1134 or may be a separate transmission), and also calculates the distance D between itself and the VUE1 1000 (block 1136').

There are a number of ways to calculate the distance D between two UEs. In some aspects, the value of D is determined based on RSU-UE ranging measurements. Returning to the example shown in FIG. 10, ranging with the two UEs can determine distance from RSU 1008 to VUE1 1000 and from RSU 1008 to VUE2 1008. The distance between VUE1 1000 and VUE2 1002 can be further determined based on the two distances and the AoA of the two links, shown as 81 and 82 in FIG. 10. For example, the difference of AoAs will suggest the angle of the two links; UE-to-UE distance D can be computed based on trigonometric functions.

In another approach, UE-to-UE distance D can be determined as a road distance (RD). In the example shown in FIG. 10, the distance from VUE 1000 to the intersection is shown as RD1 and the distance from VUE2 1002 to the intersection is shown as RD2. In this example, where VUE1 1000 and VUE2 1002 are on different roads, or on different sides of RSU 1008 on the same road, the RD value may be calculated as RD1+RD2. If VUE1 1000 and VUE2 1002 were on the same road and on the same side of the RSU 1008, the RD value may be calculated as the absolute value of (RD1−RD2). In some aspects, RSU 1008 can use AoA estimates to determine whether the two VUEs are on the same road or different roads, on the same side or different sides of the RSU, etc. When used for this purpose, the AoA estimates do not require high precision; the AoA difference thresholds may be quite coarse, e.g., pi/2, p, 3*pi/2, etc.

In yet another approach, UE-to-UE distance D can be determined as a minimum of multiple distances. For example, VUE1 1000 may perform direct SL ranging with VUE2 1002 and calculate its own value for D, referred to herein as D1. However, VUE1 1000 may not be certain that its calculation is based on a LOS path, so it compares its value for D with the value for D provided by RSU 1008, referred to herein as D2. If D1 is larger than D2, for example, VUE1 1000 may conclude that D1 was based on a NLOS path and that VUE1 1000 should use the value of D2 instead of D1. Likewise, if D1 is smaller than D2, VUE1 1000 may conclude that D1 is a more accurate estimate than D2, and that VUE1 1000 should use D1 instead of D2.

Figure 12:
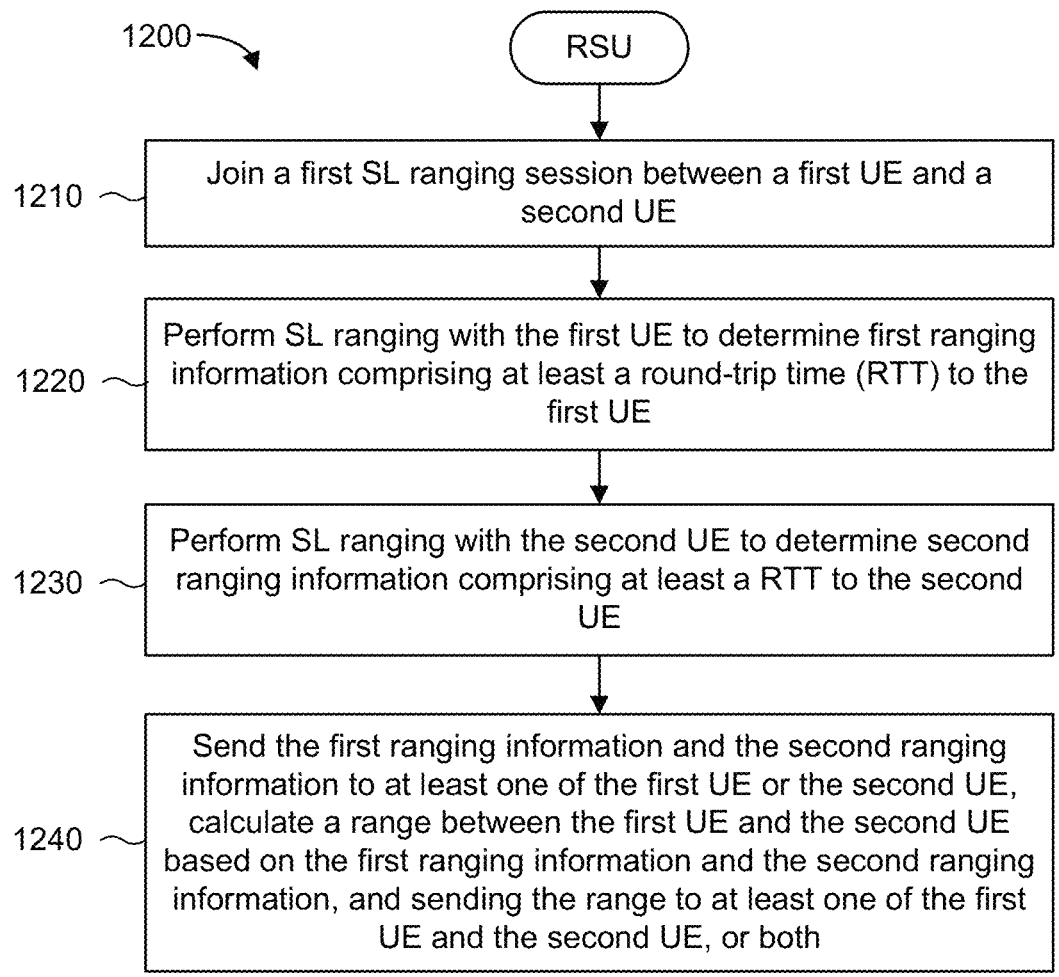
FIG. 12 is a flowchart of an example process, performed by an RSU, associated with SL ranging with RSU assistance, according to aspects of the disclosure.

FIG. 12 is a flowchart of an example process 1200 associated with SL ranging with RSU assistance, according to aspects of the disclosure. In some implementations, one or more process blocks of FIG. 12 may be performed by an RSU (e.g., RSU 1008). In some implementations, one or more process blocks of FIG. 12 may be performed by another device or a group of devices separate from or including the RSU. Additionally, or alternatively, one or more process blocks of FIG. 12 may be performed by one or more components of an apparatus, such as a processor(s), memory, or transceiver(s), any or all of which may be means for performing the operations of process 1200.

As shown in FIG. 12, process 1200 may include, at block 1210, joining a first SL ranging session between a first UE and a second UE. In some aspects, at least one of the first UE and the second UE comprises a VUE. Means for performing the operation of block 1210 may include the processor(s), memory, or transceiver(s) of any of the apparatuses described herein. For example, in some aspects, joining the first SL ranging session between the first UE and the second UE comprises broadcasting a message indicating a SL ranging capability of the RSU, receiving at least one invitation to join the first SL ranging session, determining to join the first SL ranging session, and joining the first SL ranging session. In some aspects, determining to join the first SL ranging session comprises determining to join the first SL ranging session based on a location of the RSU, a location of the first UE, a location of the second UE, or a combination thereof. In some aspects, determining to join the first SL ranging session comprises determining to join the first SL ranging session based on determining that the both the first UE and the second UE have invited the RSU to join the first SL ranging session.

As further shown in FIG. 12, process 1200 may include, at block 1220, performing SL ranging with the first UE to determine first ranging information comprising at least a RTT to the first UE. Means for performing the operation of block 1220 may include the processor(s), memory, or transceiver(s) of any of the apparatuses described herein. For example, the RSU may perform SL ranging with the first UE using its transceiver(s). In some aspects, performing SL ranging with the first UE comprises sending a first SL-PRS to the first UE, receiving a second SL-PRS from the first UE, and determining the RTT to the first UE based on timing associated with the first SL-PRS and the second SL-PRS. In some aspects, process 1200 includes determining an angle of arrival (AoA) of the second SL-PRS from the first UE.

As further shown in FIG. 12, process 1200 may include, at block 1230, performing SL ranging with the second UE to determine second ranging information comprising at least a RTT to the second UE. Means for performing the operation of block 1230 may include the processor(s), memory, or transceiver(s) of any of the apparatuses described herein. For example, the RSU may perform SL ranging with the second UE using its transceiver(s). In some aspects, performing SL ranging with the second UE comprises sending a third SL-PRS to the second UE, receiving a fourth SL-PRS from the second UE, and determining the RTT to the second UE based on timing associated with the third SL-PRS and the fourth SL-PRS. In some aspects, process 1200 includes determining an AoA of the fourth SL-PRS from the second UE.

As further shown in FIG. 12, process 1200 may include, at block 1240, at least one of: sending the first ranging information and the second ranging information to at least one of the first UE or the second UE; or calculating a range between the first UE and the second UE based on the first ranging information and the second ranging information, and sending the range to at least one of the first UE and the second UE. Means for performing the operation of block 1240 may include the processor(s), memory, or transceiver(s) of any of the apparatuses described herein. For example, the RSU may send ranging information using its transceiver(s) and may calculate ranges using its processor(s) and memory. In some aspects, calculating the range between the first UE and the second UE based on the first ranging information and the second ranging information comprises calculating a straight line distance, a road distance, or both, between the first UE and the second UE.

Process 1200 may include additional implementations, such as any single implementation or any combination of implementations described below and/or in connection with one or more other processes described elsewhere herein. Although FIG. 12 shows example blocks of process 1200, in some implementations, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
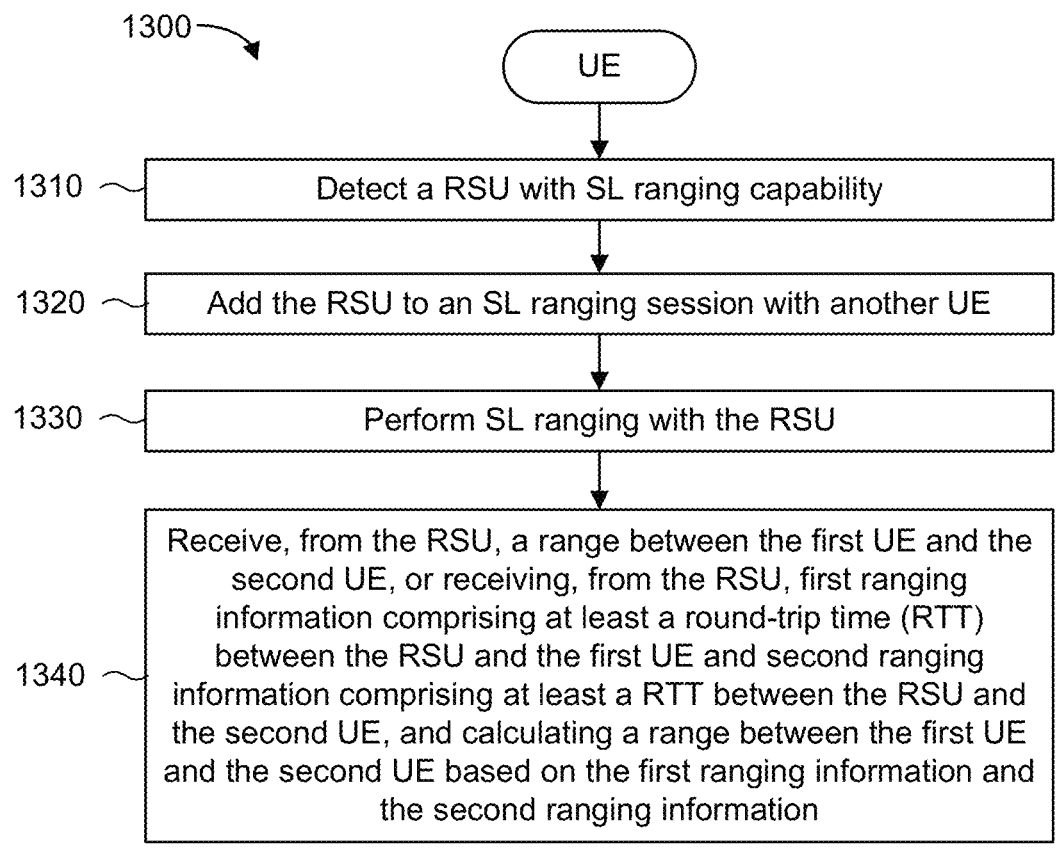
FIG. 13 is a flowchart of an example process, performed by a UE, associated with SL ranging with RSU assistance, according to aspects of the disclosure.

FIG. 13 is a flowchart of an example process 1300 associated with SL ranging with RSU assistance, according to aspects of the disclosure. In some implementations, one or more process blocks of FIG. 13 may be performed by a UE (e.g., UE 104). In some implementations, one or more process blocks of FIG. 13 may be performed by another device or a group of devices separate from or including the UE. Additionally, or alternatively, one or more process blocks of FIG. 13 may be performed by one or more components of UE 302, such as processor(s) 332, memory 340, WWAN transceiver(s) 310, short-range wireless transceiver(s) 320, satellite signal receiver 330, sensor(s) 344, user interface 346, and SL ranging component(s) 342, any or all of which may be means for performing the operations of process 1300. In the example illustrated in FIG. 13, the UE is participating in a SL ranging session with a second UE. In some aspects, at least one of the UE and the second UE comprises a VUE.

As shown in FIG. 13, process 1300 may include, at block 1310, detecting a RSU with SL ranging capability. Means for performing the operation of block 1310 may include the processor(s) 332, memory 340, or WWAN transceiver(s) 310 of the UE 302. For example, the UE 302 may detect the RSU using the receiver(s) 312. In some aspects, detecting the RSU with SL ranging capacity comprises receiving, from the RSU, a message indicating a SL ranging capability of the RSU.

As further shown in FIG. 13, process 1300 may include, at block 1320, adding the RSU to the SL ranging session. Means for performing the operation of block 1320 may include the processor(s) 332, memory 340, or WWAN transceiver(s) 310 of the UE 302. For example, the UE 302 may add the RSU to the SL ranging session, using the WWAN transceiver(s) 310 to form a group or establish as SL ranging session based on an exchange of SL messages, e.g., based on a handover procedure. In some aspects, adding the RSU to the SL ranging session comprises determining to add the RSU to the SL ranging session based on a location of the RSU, a location of the UE, a location of the second UE, or a combination thereof.

As further shown in FIG. 13, process 1300 may include, at block 1330, performing SL ranging with the RSU. Means for performing the operation of block 1330 may include the processor(s) 332, memory 340, or WWAN transceiver(s) 310 of the UE 302. For example, in some aspects, performing SL ranging with the RSU comprises receiving a first SL-PRS from the RSU via the receiver(s) 312 and sending a second SL-PRS to the RSU using the transmitter(s) 314.

As further shown in FIG. 13, process 1300 may include at, at block 1340, least one of: receiving, from the RSU, a range between the first UE and the second UE; or receiving, from the RSU, first ranging information comprising at least a RTT between the RSU and the first UE and second ranging information comprising at least a RTT between the RSU and the second UE, and calculating a range between the first UE and the second UE based on the first ranging information and the second ranging information. Means for performing the operation of block 1340 may include the processor(s) 332, memory 340, or WWAN transceiver(s) 310 of the UE 302. For example, the UE 302 may receive ranging information via the receiver(s) 312 and may calculate ranges using the processor(s) 332 and memory 340.

Process 1300 may include additional implementations, such as any single implementation or any combination of implementations described below and/or in connection with one or more other processes described elsewhere herein. Although FIG. 13 shows example blocks of process 1300, in some implementations, process 1300 may include additional blocks, fewer blocks, different blocks, or differently arranged blocks than those depicted in FIG. 13. Additionally, or alternatively, two or more of the blocks of process 1300 may be performed in parallel.

As will be appreciated, a technical advantage of the methods described herein is to enlist the assistance of a RSU to perform SL ranging in situations where it is determined or suspected there is no LOS path between VUEs. The techniques disclosed herein remove uncertainty of measurements due to suspected NLOS conditions and improves confidence of SL ranging results.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an electrical insulator and an electrical conductor). Furthermore, it is also intended that aspects of a clause can be included in any other independent clause, even if the clause is not directly dependent on the independent clause.

Implementation examples are described in the following numbered clauses:

Clause 1. A method of wireless positioning performed by a road-side unit (RSU), the method comprising: joining a first sidelink (SL) ranging session between a first user equipment (UE) and a second UE; performing SL ranging with the first UE to determine first ranging information comprising at least a round-trip time (RTT) to the first UE; performing SL ranging with the second UE to determine second ranging information comprising at least a RTT to the second UE; and at least one of: sending the first ranging information and the second ranging information to at least one of the first UE or the second UE; or calculating a range between the first UE and the second UE based on the first ranging information and the second ranging information, and sending the range to at least one of the first UE or the second UE.

Clause 2. The method of clause 1, wherein joining the first SL ranging session between the first UE and the second UE comprises: broadcasting a message indicating a SL ranging capability of the RSU; receiving at least one invitation to join the first SL ranging session; and joining the first SL ranging session.

Clause 3. The method of clause 2, wherein joining the first SL ranging session comprises determining to join the first SL ranging session based on a location of the RSU, a location of the first UE, a location of the second UE, or a combination thereof.

Clause 4. The method of any of clauses 2 to 3, wherein joining the first SL ranging session comprises determining to join the first SL ranging session based on determining that both the first UE and the second UE have invited the RSU to join the first SL ranging session.

Clause 5. The method of any of clauses 1 to 4, wherein performing SL ranging with the first UE comprises sending a first SL-PRS to the first UE, receiving a second SL-PRS from the first UE, and determining the RTT to the first UE based on timing associated with the first SL-PRS and the second SL-PRS.

Clause 6. The method of clause 5, further comprising determining an angle of arrival (AoA) of the second SL-PRS from the first UE.

Clause 7. The method of any of clauses 1 to 6, wherein performing SL ranging with the second UE comprises sending a third SL-PRS to the second UE, receiving a fourth SL-PRS from the second UE, and determining the RTT to the second UE based on timing associated with the third SL-PRS and the fourth SL-PRS.

Clause 8. The method of clause 7, further comprising determining an angle of arrival (AoA) of the fourth SL-PRS from the second UE.

Clause 9. The method of any of clauses 1 to 8, wherein calculating the range between the first UE and the second UE based on the first ranging information and the second ranging information comprises calculating a straight line distance, a road distance, or both, between the first UE and the second UE.

Clause 10. The method of any of clauses 1 to 9, wherein at least one of the first UE and the second UE comprises a vehicle UE (VUE).

Clause 11. A method of wireless positioning performed by a first user equipment (UE) that is participating in a sidelink (SL) ranging session with a second UE, the method comprising: detecting a road-side unit (RSU) with SL ranging capability; adding the RSU to the SL ranging session; performing SL ranging with the RSU; and at least one of: receiving, from the RSU, a range between the first UE and the second UE; or receiving, from the RSU, first ranging information comprising at least a round-trip time (RTT) between the RSU and the first UE and second ranging information comprising at least a RTT between the RSU and the second UE, and calculating a range between the first UE and the second UE based on the first ranging information and the second ranging information.

Clause 12. The method of clause 11, wherein detecting the RSU with SL ranging capacity comprises receiving, from the RSU, a message indicating a SL ranging capability of the RSU.

Clause 13. The method of any of clauses 11 to 12, wherein adding the RSU to the SL ranging session comprises determining to add the RSU to the SL ranging session based on a location of the RSU, a location of the first UE, a location of the second UE, or a combination thereof.

Clause 14. The method of any of clauses 11 to 13, wherein performing SL ranging with the RSU comprises receiving a first SL-PRS from the RSU and sending a second SL-PRS to the RSU.

Clause 15. The method of any of clauses 11 to 14, wherein at least one of the first UE and the second UE comprises a vehicle UE (VUE).

Clause 16. A road-side unit (RSU), comprising: a memory; at least one transceiver; and at least one processor communicatively coupled to the memory and the at least one transceiver, the at least one processor configured to: join a first sidelink (SL) ranging session between a first user equipment (UE) and a second UE; perform SL ranging with the first UE to determine first ranging information comprising at least a round-trip time (RTT) to the first UE; perform SL ranging with the second UE to determine second ranging information comprising at least a RTT to the second UE; and at least one of: send, via the at least one transceiver, the first ranging information and the second ranging information to at least one of the first UE or the second UE; or calculate a range between the first UE and the second UE based on the first ranging information and the second ranging information, and send, via the at least one transceiver, the range to at least one of the first UE and the second UE.

Clause 17. The RSU of clause 16, wherein, to join the first SL ranging session between the first UE and the second UE, the at least one processor is configured to: broadcast a message indicating a SL ranging capability of the RSU; receive, via the at least one transceiver, at least one invitation to join the first SL ranging session; and join the first SL ranging session.

Clause 18. The RSU of clause 17, wherein, to join the first SL ranging session, the at least one processor is configured to determine to join the first SL ranging session based on a location of the RSU, a location of the first UE, a location of the second UE, or a combination thereof.

Clause 19. The RSU of any of clauses 17 to 18, wherein, to join the first SL ranging session, the at least one processor is configured to determine to join the first SL ranging session based on determining that both the first UE and the second UE have invited the RSU to join the first SL ranging session.

Clause 20. The RSU of any of clauses 16 to 19, wherein, to perform SL ranging with the first UE, the at least one processor is configured to send a first SL-PRS to the first UE, receive a second SL-PRS from the first UE, and determine the RTT to the first UE based on timing associated with the first SL-PRS and the second SL-PRS.

Clause 21. The RSU of clause 20, wherein the at least one processor is further configured to determine an angle of arrival (AoA) of the second SL-PRS from the first UE.

Clause 22. The RSU of any of clauses 16 to 21, wherein, to perform SL ranging with the second UE, the at least one processor is configured to send a third SL-PRS to the second UE, receive a fourth SL-PRS from the second UE, and determine the RTT to the second UE based on timing associated with the third SL-PRS and the fourth SL-PRS.

Clause 23. The RSU of clause 22, wherein the at least one processor is further configured to determine an angle of arrival (AoA) of the fourth SL-PRS from the second UE.

Clause 24. The RSU of any of clauses 16 to 23, wherein, to calculate the range between the first UE and the second UE based on the first ranging information and the second ranging information, the at least one processor is configured to calculate a straight line distance, a road distance, or both, between the first UE and the second UE.

Clause 25. The RSU of any of clauses 16 to 24, wherein at least one of the first UE and the second UE comprises a vehicle UE (VUE).

Clause 26. A user equipment (UE), comprising: a memory; at least one transceiver; and at least one processor communicatively coupled to the memory and the at least one transceiver, the at least one processor configured to: detect a road-side unit (RSU) with SL ranging capability; add the RSU to a SL ranging session between the UE and a second UE; perform SL ranging with the RSU; and at least one of: receive, from the RSU via the at least one transceiver, a range between the UE and the second UE; or receive, from the RSU via the at least one transceiver, first ranging information comprising at least a round-trip time (RTT) between the RSU and the UE and second ranging information comprising at least a RTT between the RSU and the second UE, and calculate a range between the UE and the second UE based on the first ranging information and the second ranging information.

Clause 27. The UE of clause 26, wherein, to detect the RSU with SL ranging capacity, the at least one processor is configured to receive, from the RSU, a message indicating a SL ranging capability of the RSU.

Clause 28. The UE of any of clauses 26 to 27, wherein, to add the RSU to the SL ranging session between the UE and the second UE, the at least one processor is configured to determine to add the RSU to the SL ranging session based on a location of the RSU, a location of the UE, a location of the second UE, or a combination thereof.

Clause 29. The UE of any of clauses 26 to 28, wherein, to perform SL ranging with the RSU, the at least one processor is configured to receive a first SL-PRS from the RSU and send a second SL-PRS to the RSU.

Clause 30. The UE of any of clauses 26 to 29, wherein at least one of the UE and the second UE comprises a vehicle UE (VUE).

Clause 31. An apparatus comprising a memory, a transceiver, and a processor communicatively coupled to the memory and the transceiver, the memory, the transceiver, and the processor configured to perform a method according to any of clauses 1 to 15.

Clause 32. An apparatus comprising means for performing a method according to any of clauses 1 to 15.

Clause 33. A non-transitory computer-readable medium storing computer-executable instructions, the computer-executable comprising at least one instruction for causing a computer or processor to perform a method according to any of clauses 1 to 15.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of wireless positioning performed by a road-side unit (RSU), the method comprising:
    joining a first sidelink (SL) ranging session between a first user equipment (UE) and a second UE;
    performing SL ranging with the first UE to determine first ranging information comprising at least a round-trip time (RTT) to the first UE;
    performing SL ranging with the second UE to determine second ranging information comprising at least a RTT to the second UE; and
    at least one of:
        sending the first ranging information and the second ranging information to at least one of the first UE or the second UE; or
        calculating a range between the first UE and the second UE based on the first ranging information and the second ranging information, and sending the range to at least one of the first UE or the second UE.

2. The method of claim 1, wherein joining the first SL ranging session between the first UE and the second UE comprises:
    broadcasting a message indicating a SL ranging capability of the RSU;
    receiving at least one invitation to join the first SL ranging session; and
    joining the first SL ranging session.

3. The method of claim 2, wherein joining the first SL ranging session comprises determining to join the first SL ranging session based on a location of the RSU, a location of the first UE, a location of the second UE, or a combination thereof.

4. The method of claim 2, wherein joining the first SL ranging session comprises determining to join the first SL ranging session based on determining that both the first UE and the second UE have invited the RSU to join the first SL ranging session.

5. The method of claim 1, wherein performing SL ranging with the first UE comprises sending a first SL-PRS to the first UE, receiving a second SL-PRS from the first UE, and determining the RTT to the first UE based on timing associated with the first SL-PRS and the second SL-PRS.

6. The method of claim 5, further comprising determining an angle of arrival (AoA) of the second SL-PRS from the first UE.

7. The method of claim 1, wherein performing SL ranging with the second UE comprises sending a third SL-PRS to the second UE, receiving a fourth SL-PRS from the second UE, and determining the RTT to the second UE based on timing associated with the third SL-PRS and the fourth SL-PRS.

8. The method of claim 7, further comprising determining an angle of arrival (AoA) of the fourth SL-PRS from the second UE.

9. The method of claim 1, wherein calculating the range between the first UE and the second UE based on the first ranging information and the second ranging information comprises calculating a straight line distance, a road distance, or both, between the first UE and the second UE.

10. The method of claim 1, wherein at least one of the first UE and the second UE comprises a vehicle UE (VUE).

11. A method of wireless positioning performed by a first user equipment (UE) that is participating in a sidelink (SL) ranging session with a second UE, the method comprising:
    detecting a road-side unit (RSU) with SL ranging capability;
    adding the RSU to the SL ranging session;
    performing SL ranging with the RSU; and
    at least one of:
        receiving, from the RSU, a range between the first UE and the second UE; or
        receiving, from the RSU, first ranging information comprising at least a round-trip time (RTT) between the RSU and the first UE and second ranging information comprising at least a RTT between the RSU and the second UE, and calculating a range between the first UE and the second UE based on the first ranging information and the second ranging information.

12. The method of claim 11, wherein detecting the RSU with SL ranging capacity comprises receiving, from the RSU, a message indicating a SL ranging capability of the RSU.

13. The method of claim 11, wherein adding the RSU to the SL ranging session comprises determining to add the RSU to the SL ranging session based on a location of the RSU, a location of the first UE, a location of the second UE, or a combination thereof.

14. The method of claim 11, wherein performing SL ranging with the RSU comprises receiving a first SL-PRS from the RSU and sending a second SL-PRS to the RSU.

15. The method of claim 11, wherein at least one of the first UE and the second UE comprises a vehicle UE (VUE).

16. A road-side unit (RSU), comprising:
a memory;
at least one transceiver; and
at least one processor communicatively coupled to the memory and the at least one transceiver, the at least one processor configured to:
join a first sidelink (SL) ranging session between a first user equipment (UE) and a second UE;
perform SL ranging with the first UE to determine first ranging information comprising at least a round-trip time (RTT) to the first UE;
perform SL ranging with the second UE to determine second ranging information comprising at least a RTT to the second UE; and
at least one of:
send, via the at least one transceiver, the first ranging information and the second ranging information to at least one of the first UE or the second UE; or
calculate a range between the first UE and the second UE based on the first ranging information and the second ranging information, and send, via the at least one transceiver, the range to at least one of the first UE and the second UE.

17. The RSU of claim 16, wherein, to join the first SL ranging session between the first UE and the second UE, the at least one processor is configured to:
broadcast a message indicating a SL ranging capability of the RSU;
receive, via the at least one transceiver, at least one invitation to join the first SL ranging session; and
join the first SL ranging session.

18. The RSU of claim 17, wherein, to join the first SL ranging session, the at least one processor is configured to determine to join the first SL ranging session based on a location of the RSU, a location of the first UE, a location of the second UE, or a combination thereof.

19. The RSU of claim 17, wherein, to join the first SL ranging session, the at least one processor is configured to determine to join the first SL ranging session based on determining that both the first UE and the second UE have invited the RSU to join the first SL ranging session.

20. The RSU of claim 16, wherein, to perform SL ranging with the first UE, the at least one processor is configured to send a first SL-PRS to the first UE, receive a second SL-PRS from the first UE, and determine the RTT to the first UE based on timing associated with the first SL-PRS and the second SL-PRS.

21. The RSU of claim 20, wherein the at least one processor is further configured to determine an angle of arrival (AoA) of the second SL-PRS from the first UE.

22. The RSU of claim 16, wherein, to perform SL ranging with the second UE, the at least one processor is configured to send a third SL-PRS to the second UE, receive a fourth SL-PRS from the second UE, and determine the RTT to the second UE based on timing associated with the third SL-PRS and the fourth SL-PRS.

23. The RSU of claim 22, wherein the at least one processor is further configured to determine an angle of arrival (AoA) of the fourth SL-PRS from the second UE.

24. The RSU of claim 16, wherein, to calculate the range between the first UE and the second UE based on the first ranging information and the second ranging information, the at least one processor is configured to calculate a straight line distance, a road distance, or both, between the first UE and the second UE.

25. The RSU of claim 16, wherein at least one of the first UE and the second UE comprises a vehicle UE (VUE).

26. A user equipment (UE), comprising:
a memory;
at least one transceiver; and
at least one processor communicatively coupled to the memory and the at least one transceiver, the at least one processor configured to:
detect a road-side unit (RSU) with SL ranging capability;
add the RSU to a SL ranging session between the UE and a second UE;
perform SL ranging with the RSU; and
at least one of:
receive, from the RSU via the at least one transceiver, a range between the UE and the second UE; or
receive, from the RSU via the at least one transceiver, first ranging information comprising at least a round-trip time (RTT) between the RSU and the UE and second ranging information comprising at least a RTT between the RSU and the second UE, and calculate a range between the UE and the second UE based on the first ranging information and the second ranging information.

27. The UE of claim 26, wherein, to detect the RSU with SL ranging capacity, the at least one processor is configured to receive, from the RSU, a message indicating a SL ranging capability of the RSU.

28. The UE of claim 26, wherein, to add the RSU to the SL ranging session between the UE and the second UE, the at least one processor is configured to determine to add the RSU to the SL ranging session based on a location of the RSU, a location of the UE, a location of the second UE, or a combination thereof.

29. The UE of claim 26, wherein, to perform SL ranging with the RSU, the at least one processor is configured to receive a first SL-PRS from the RSU and send a second SL-PRS to the RSU.

30. The UE of claim 26, wherein at least one of the UE and the second UE comprises a vehicle UE (VUE).

\* \* \* \* \*